US010296928B1

(12) United States Patent
Leibon et al.

(10) Patent No.: US 10,296,928 B1
(45) Date of Patent: May 21, 2019

(54) SYSTEM AND METHODS FOR MEASURING AND INFLUENCING CUSTOMER TRAJECTORY WITHIN A PRODUCT SPACE

(71) Applicant: COHERENT PATH INC., Boston, MA (US)

(72) Inventors: Gregory D. Leibon, Post Mills, VT (US); Robert C. Taintor, Somerville, MA (US); Kyle Lad, Exeter, NH (US); Alastair Halliday, Barrington, RI (US); Kevin Roisin, Cary, NC (US)

(73) Assignee: Coherent Path Inc., Boston, MA (US)

( * ) Notice: Subject to any disclaimer, the term of this patent is extended or adjusted under 35 U.S.C. 154(b) by 853 days.

(21) Appl. No.: 14/539,062

(22) Filed: Nov. 12, 2014

Related U.S. Application Data

(60) Provisional application No. 61/903,081, filed on Nov. 12, 2013.

(51) Int. Cl.
*G06Q 30/02* (2012.01)
(52) U.S. Cl.
CPC ................. *G06Q 30/0204* (2013.01)
(58) Field of Classification Search
CPC ...................................................... G06Q 30/02
See application file for complete search history.

(56) References Cited

U.S. PATENT DOCUMENTS

| | | | | |
|---|---|---|---|---|
| 6,487,539 B1* | 11/2002 | Aggarwal | ............. | G06Q 30/02 705/14.23 |
| 6,839,682 B1* | 1/2005 | Blume | ................... | G06Q 30/02 705/14.4 |
| 2001/0014868 A1* | 8/2001 | Herz | .................. | G06Q 10/0637 705/14.38 |
| 2009/0222342 A1* | 9/2009 | Greene | .................. | G06Q 30/02 705/14.53 |
| 2011/0200226 A1* | 8/2011 | Takahata | ............ | G06K 9/00295 382/103 |
| 2011/0213661 A1* | 9/2011 | Milana | .................... | G06Q 30/02 705/14.52 |
| 2012/0109710 A1* | 5/2012 | Rahman | ............ | G06F 17/30867 705/7.31 |
| 2013/0054604 A1* | 2/2013 | Boldyrev | .......... | G06F 17/30997 707/739 |
| 2013/0191377 A1* | 7/2013 | Zelevinsky | ....... | G06F 17/30867 707/723 |

* cited by examiner

*Primary Examiner* — Kurtis Gills
(74) *Attorney, Agent, or Firm* — Finch & Maloney PLLC

(57) ABSTRACT

A system configured to forecast human behavior is provided. The system includes a memory storing information descriptive of a set of content including a plurality of elements, at least one processor coupled to the memory, and a plurality of components executable by at least one processor. The plurality of components include a mapping engine configured to retrieve the information associated with the set of content from the memory and generate a data space representative of relationships between the plurality of elements, a compression component configured to generate a customer compression representative of a behavior of at least one customer within the data space, a persuasion engine configured to identify at least one customer trajectory through the data space associated with the at least one customer based on at least the customer compression, and an interface component configured to provide output describing the at least one customer trajectory.

13 Claims, 21 Drawing Sheets

Customers Qualifying as Loyal

5.2%

Parameters for a Customer to be Loyal

- Made first purchase more than 119 days ago: 95.88%  1502
- Makes a transaction more than 14 times per year: 8.58%  1504
- Spends more than $100.46 per year: 47.52%  1506
- Last had a transaction less than 575 days ago: 48.05%  1508

Products Most Associated to Loyal Customers

| Item | Product Group | Product Subgroup | Description | Likelihood |
|---|---|---|---|---|
| 4384743647 | Group 1 | Subgroup 1 | Product description | 8.3 |
| 4384740938 | Group 2 | Subgroup 3 | ... | 8.2 |
| 4384739980 | Group 2 | Subgroup 7 | ... | 8.3 |
| 4384739345 | Group 3 | Subgroup 3 | ... | 8.3 |
| 4384738894 | Group 2 | Subgroup 4 | ... | 8.3 |
| 4384723337 | Group 1 | Subgroup 6 | ... | 8.3 |
| 4384720578 | Group 2 | Subgroup 5 | ... | 8.3 |
| 4384718626 | Group 2 | Subgroup 7 | ... | 8.3 |
| 4384706271 | Group 4 | Subgroup 8 | ... | 8.3 |
| 4384702646 | Group 2 | Subgroup 9 | ... | 8.3 |
| 4384689548 | Group 1 | Subgroup 10 | ... | 8.3 |
| 4384677943 | Group 2 | Subgroup 5 | ... | 8.3 |
| 4384667849 | Group 3 | Subgroup 8 | ... | 8.3 |
| 4384665227 | Group 2 | Subgroup 6 | ... | 8.3 |

1510

Products Least Associated to Loyal Customers

| Item | Product Group | Product Subgroup | Description | Likelihood |
|---|---|---|---|---|
| 4384711461 | Group 1 | Subgroup 1 | Product description | 0.03 |
| 4384709972 | Group 1 | Subgroup 3 | ... | 0.04 |
| 4384783617 | Group 1 | Subgroup 7 | ... | 0.05 |
| 4384711606 | Group 2 | Subgroup 8 | ... | 0.06 |
| 4384695710 | Group 2 | Subgroup 9 | ... | 0.06 |
| 4384678599 | Group 2 | Subgroup 6 | ... | 0.06 |
| 4384694877 | Group 2 | Subgroup 8 | ... | 0.07 |
| 4384673452 | Group 2 | Subgroup 9 | ... | 0.07 |
| 4384672812 | Group 3 | Subgroup 10 | ... | 0.07 |
| 4384707640 | Group 3 | Subgroup 5 | ... | 0.08 |
| 4384672426 | Group 4 | Subgroup 6 | ... | 0.08 |
| 4384692404 | Group 4 | Subgroup 11 | ... | 0.08 |

SYSTEM AND METHODS FOR MEASURING AND INFLUENCING CUSTOMER TRAJECTORY WITHIN A PRODUCT SPACE

CROSS REFERENCE TO RELATED APPLICATIONS

This application claims priority under 35 U.S.C. § 119(e) to U.S. Provisional Application Ser. No. 61/903,081 titled "SYSTEMS AND METHODS FOR MEASURING AND INFLUENCING CUSTOMER TRAJECTORY WITHIN A PRODUCT SPACE," filed Nov. 12, 2013, which is hereby incorporated herein by reference in its entirety.

BACKGROUND

Recommendation engines and search engines perform operations on data spaces of information, such as encyclopedia-type knowledge spaces, consumer-oriented product spaces (such as a company's product catalogue), or more general information spaces (such as the entire world-wide-web). Conventionally, systems capable of exploring data sets for the purpose of making recommendations have provided the ability for producing quality local recommendations. A local recommendation indicates a next action that an individual is likely to take based on analysis of the individual's previous actions as recorded in the data set. A consumer who is offered a quality local recommendation is likely to follow the local recommendation.

SUMMARY OF INVENTION

Aspects and embodiments described herein manifest an appreciation that systems providing only local recommendations often lack foresight into a consumer's likely behavior beyond acting on the local recommendation. Such tools do not provide an organization, such as a business offering products for sale, insight into long term engagement and relationships with a customer.

Given the limitations of local recommendation systems for understanding long term consequences of customers acting on such local recommendations, there exists a need for data analysis systems and processes that provide organizations with long-term future insights into a customer's likely interests in a business's product catalogue. By determining relationships between sets of products in a business's product or service catalogue, relationships between that business's offerings and entire population of customers, and a current characterization of individual customers under study, a system capable of providing non-local understanding of the relationship between individual customers and an entire product catalogue can be produced. Aspects and embodiments of disclosed herein are directed to systems and methods that provide capability for globally analyzing and influencing customer location and trajectory within a business's product space. By understanding the relationship of a customer to a product space, a recommendation system can be constructed that takes into account a business's desire for creating long-term, high value interaction with the customer. In contrast to local recommendation systems that may produce successful product recommendations for engaging a user with a next single product offering, but which ultimately leads a customer in a direction of low value to the business, a system capable of mapping a multi-dimensional product space, placing a customer within that global product space, and determining the customer's direction within the product space can take into account a customer's entire journey through that product space. By understanding a customer's history and current location within the product space, the relationships between all products in the product space, as well as the customer's likely future actions, the systems and methods disclosed herein aid a business in providing product recommendations that are capable of creating long-term customer engagement of high-value to the business. The systems and methods described herein provide capabilities to analyze and visualize a customer's journey through the product space, experiment with potential alterations to the customer's journey, select high value recommendations to present to a customer, and learn from customer's subsequent actions to improve future performance of the system.

According to one aspect, a system configured to forecast human behavior is provided. The system includes a memory storing information descriptive of a set of content including a plurality of elements, at least one processor coupled to the memory, and a plurality of components executable by at least one processor. The plurality of components include a mapping engine configured to retrieve the information associated with the set of content from the memory and generate a data space representative of relationships between the plurality of elements, a compression component configured to generate a customer compression representative of a behavior of at least one customer within the data space, a persuasion engine configured to identify at least one customer trajectory through the data space associated with the at least one customer based on at least the customer compression, and an interface component configured to provide output describing the at least one customer trajectory.

In one embodiment, the set of content includes content descriptive of a plurality of products and the data space includes a product space associated with the plurality of products. In this embodiment, the compression component may be further configured to generate the at least one customer compression by generating at least one customer compression representative of a product purchasing behavior of at least one customer within the product space.

In one embodiment, the mapping engine is further configured to determine local geometries of the data space based on similarities between the plurality of elements, determine a compass representative of boundaries of the data space, and link the local geometries of the data space to the compass. In another embodiment, the at least one customer trajectory is comprised of a geodesic defined on a hyperbolic geometry.

In one embodiment, the persuasion component is further configured to receive business objective information representative of a desired termination location of the customer trajectory within the data space. In one embodiment, the persuasion component may be further configured to generate at least one recommendation based on the customer trajectory and the desired termination location of the customer trajectory. In one embodiment, the interface may be further configured to provide an indication of the at least one recommendation. In one embodiment, the system further includes a business intelligence engine executable by the at least one processor and configured to measure an impact of the recommendation on the customer trajectory.

In one embodiment, the interface component is further configured to provide a customer map representative of the compression overlaid on the data space.

According to one aspect, a method for forecasting human behavior is provided. The method includes storing, in a memory coupled to at least one processor, information descriptive of a set of content including a plurality of elements, retrieving, by a mapping engine executable by the at least one processor, the information associated with the set of content from the memory, generating, by the mapping engine, a data space representative of relationships between the plurality of elements, generating, by a compression component executable by the at least one processor, a customer compression representative of a behavior of at least one customer within the data space, identifying, by a persuasion engine executable by the at least one processor, at least one customer trajectory through the data space associated with the at least one customer based on at least the customer compression, and providing, by an interface component executable by the at least one processor, output describing the at least one customer trajectory.

In one embodiment, the act of storing information descriptive of a set of content including a plurality of elements includes storing information descriptive of a plurality of products and wherein generating the data space includes generating a product space associated with the plurality of products. In this embodiment, the act of generating the customer compression may include generating at least one customer compression representative of a product purchasing behavior of at least one customer within the product space.

In one embodiment, the method further includes determining local geometries of the data space based on similarities between the plurality of elements, determining a compass representative of boundaries of the data space, and linking the local geometries of the data space to the compass.

In one embodiment, the act of identifying at least one customer trajectory includes identifying a geodesic defined on a hyperbolic geometry.

In one embodiment, the method further includes receiving business objective information representative of a desired termination location of the customer trajectory within the data space. In one embodiment, the method further includes generating at least one recommendation based on the customer trajectory and the desired termination location of the customer trajectory. In one embodiment, the method further includes providing an indication of the at least one recommendation. In one embodiment, the method further includes measuring an impact of the recommendation on the customer trajectory.

According to one aspect, a non-transitory computer readable medium having stored thereon sequences of computer-executable instructions for forecasting human behavior is provided. The sequences of computer-executable instructions include instructions that instruct at least one processor to store information descriptive of a set of content including a plurality of elements, retrieve the information associated with the set of content from the memory and generate a data space representative of relationships between the plurality of elements, generate a customer compression representative of a behavior of at least one customer within the data space, identify at least one customer trajectory through the data space associated with the at least one customer based on at least the customer compression, and provide output describing the at least one customer trajectory.

According to at least one embodiment, a system configured to forecast human behavior is provided. The system includes a memory storing data descriptive of a plurality of responses to content, each response of the plurality of responses having been exhibited by a person of a plurality of persons. The system also includes at least one processor coupled to the memory and a compression component executable by the at least one processor and configured to summarize the data descriptive of the plurality of responses into a plurality of compressions, each compression of the plurality of compressions having associated content and including a plurality of attributes shared by each person of the plurality of persons. The system also includes a persuasion engine executable by the at least one processor and configured to receive data descriptive of a group of persons, the data describing the group in terms of one or more values of attributes of the plurality of attributes; identify content associated with the group of persons; and identify at least one path between content associated with a compression of the plurality of compressions and the content associated with the group of persons. The system also includes an interface component executable by the at least one processor and configured to provide output describing the at least one path.

The system may further include a mapping engine executable by at least one processor and configured to receive data descriptive of a set of content including the content associated with the group of persons and the content associated with the compression; identify directions descriptive of subsets of elements within the set of content; identify relationships between elements of content within the set of content; identify relationships between the elements of content and the directions; define a plurality of paths between the elements relative to the directions, the plurality of paths including the at least one path.

In the system, the set of content includes content descriptive of products. In addition, the at least one path may include a geodesic defined on a hyperbolic geometry.

Still other aspects, embodiments and advantages of these example aspects and embodiments, are discussed in detail below. It is appreciated that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 15 illustrates another example user interface of analytics representing the results of influencing customers' movement through a product space;

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Some of the embodiments disclosed herein implement an entity and person mapping and recommendation system that utilizes hyperbolic geometry to determine the current and likely future relationships between a set of entities and a set of people. In some embodiments, the entities can be knowledge spaces and people can be users of systems allowing for navigation of a knowledge space. One such embodiment of a knowledge space that can be navigated is the mathematics web pages of WIKIPEDIA. The mathematics pages effectively realize the "space of mathematics" and navigation within the knowledge space is an act of exploration of a world of mathematical ideas. Natural directions in this space are broad overarching concepts such as "geometry" or "probability." A curious explorer of the world of mathematics "coming from calculus" might wish to navigate from a particular concept (e.g., The Fundamental Theorem of Calculus) in the "direction of geometry" to discover related geometric concepts and applications.

Figure 1:
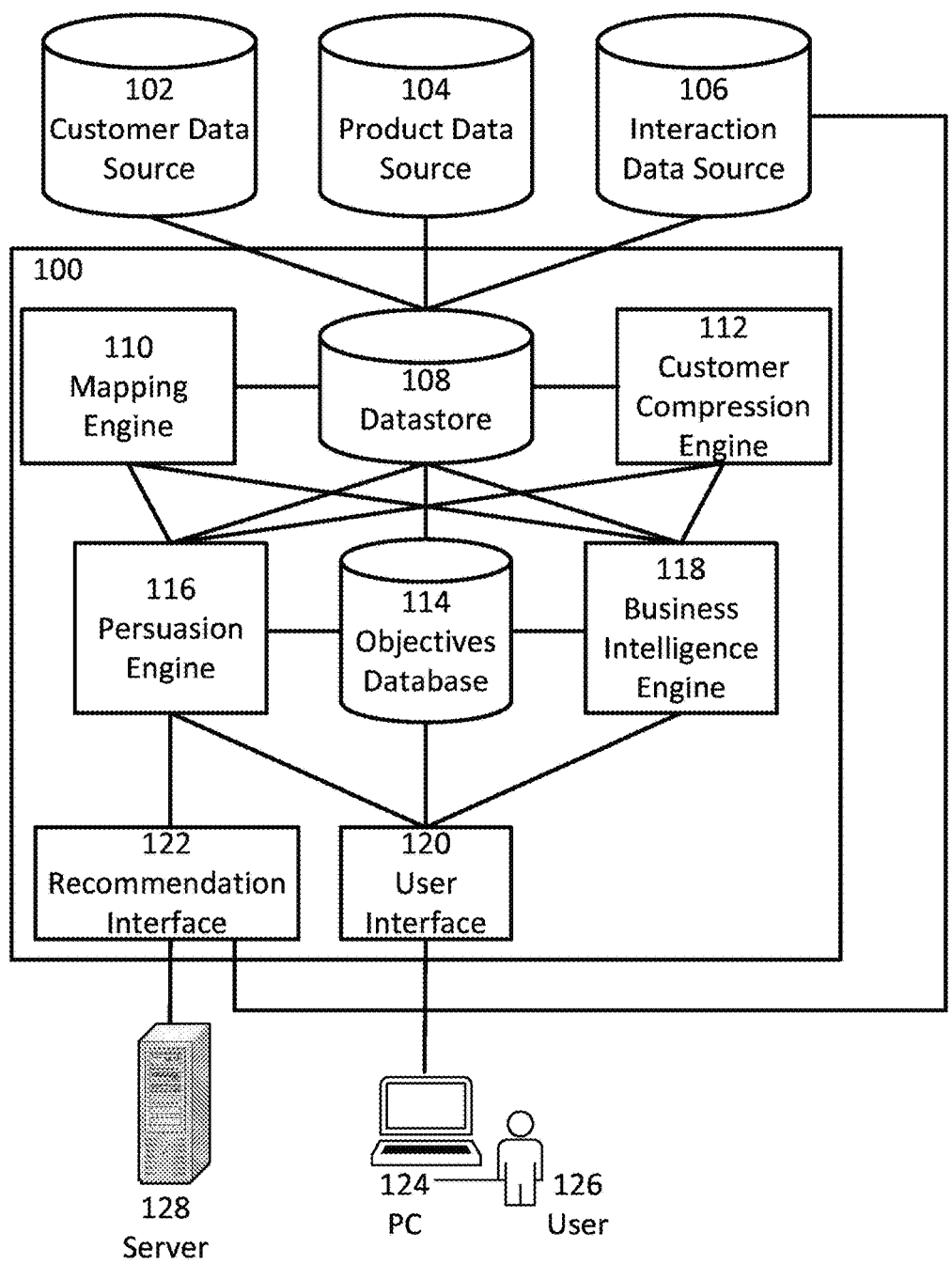
FIG. 1 illustrates an example system for modeling the current location and trajectory of a customer within a product space and for determining recommendations producing high value, coherent trajectories for the customer within the product space.

In some embodiments, the entities can be products in a product space of including products or services offered by a business to a set of people that are customers or consumers of those products or services. FIG. 1 illustrates one of these embodiments, a mapping and recommendation system 100. As shown, the mapping and recommendation system 100 includes connections to a customer data source 102, a product data source 104, and an interaction data source 106. The customer data source 102 can contain data about the customers who interact with a business. This customer data might include demographic data for individual consumers, such as consumers at a retail establishment, business data for enterprise customers, such as the profile of retail shops in relation to a wholesale distributor, or e-commerce information related to an e-commerce provider. The product data source 104 can contain data about the products in a business's catalogue with which a customer might interact. This product data can include information about various items for sale in a retail environment, services available from a service provider, applications available for download or purchase from a website, the various pages and features within a business's website, or any other product, service, or offering that a business may use to interact with a customer. The interaction data source 106 can contain data about the relationships between customers and products, such information related to product purchases, products viewed on a business's website, products scanned within a retail environment, as well as various types of marketing interactions such as e-mail, print or radio ads, phone contact, recommendations on search engines or shopping sites.

In some embodiments, system 100 can receive information from the customer data source 102, product data source 104, and interaction data source 106 and store the received data in a common data store 108. A mapping engine 110 connected to the data store 108 can retrieve information from the data store 108 related to customer data, product data, or interaction data to produce maps of a product space. As described in more detail below, the product maps and customer maps associated with a product space and produced by the mapping engine are multi-dimensional hyperbolic geometries representing respectively the relationships between products that comprise a product space, and customers placed within that product space. In some embodiments, the mapping engine 110 can also include functionality for creating a product compass that defines the boundaries of a product space and provides a global orientation to the local relationships between products within the product map. In some embodiments described below, the mapping engine 110 also can also include functionality for determining geodesic paths between compass points at the boundary of a product space passing through various points within the product space. In various embodiments, product map information and customer map information produced by the mapping engine 110 can be stored within data store 108 for later use in other parts of the system 100.

In various embodiments, system 100 can also include a customer compression engine 112 connected to the data store 108 that processes customer data, product data, and customer-product interaction data to categorize individual customers and define a representation of individual customers within a product space. As described in more detail below, a customer compression produced by the customer compression engine 112 can utilize information learned or inferred from existing customer and product data to produce an appropriate representation of a customer within the current product space. In various embodiments, customer compressions produced by the customer compression engine can be stored within the data store 108 for later use in other parts of the system 100.

In some embodiments, system 100 can also include an objectives database 114 that stores information related to defined goals set by a business relevant to a product space. In various embodiments, the defined objectives stored within the objectives database can include business objectives related to a business's long term success. Examples of business objectives include achieving revenue targets based on customers making above average purchases, improving conversion rates from initial customers to long-term loyal customers, increasing the awareness of particular portions of a product space among defined customer segments.

In various embodiments, system 100 can also include a persuasion engine 116. The persuasion engine 116 can connect to the data store 108, the mapping engine 110, the customer compression engine 112, the objectives database 114, and a user interface 120. The persuasion engine 116 can include functionality for placing a characterization of a customer produced by the customer compression engine 112 on a product map produced by the mapping engine 110 in order to create a customer model. In various embodiments, the persuasion engine 116 can also include functionality for determining trajectories of a customer that exists within a product space. As described in more detail below, the current trajectory of a customer within a product space represents the probable path a customer will take when interacting with products in the product space based on the categorization of the customer produced by a customer compression, the compass points currently associated with a customer, and the existence and weights of links between products within the product map. In various embodiments, the persuasion engine 116 can also include functionality for testing the effects of various product offerings and recommendations to produce altered customer trajectories through a product space. As described further below, by persuading a customer to choose a particular set of steps within a product space through appropriate product recommendations, a customer can be encouraged to travel along a path through the product space that has high value to the business while still being attractive to the customer at each step of the journey. The path can either be utilized in the back end of a recommendation-like system or explicitly demonstrated to a business user 126 and/or end customer. An example interface providing functionality for a user to interact with a path through a product space is discussed below in reference to FIG. 11B.

In various embodiments, the persuasion engine 116 can also be used to provide a learning framework offering feedback for use by the mapping engine 110 and customer compression engine 112 used to refine the product geometries and customer-product models. In various embodiments, the training and optimization performed by the persuasion engine 116 can utilize business objectives and customer objectives stored within the objectives database 114 to further refine model customer trajectories of highest value to the business. In some embodiments, the persuasion engine 116 can include functionality for introducing test groups of customers or test groups of products into a product map to measure their effects on current customer trajectory within the product space. In various embodiments, the persuasion engine 116 can also include functionality for modifying parameters relative to the introduced test groups of customers or test groups of products within the product space, as well as selecting product map parameters that optimize desired business objectives.

In various embodiments, system 100 can also include a business intelligence engine 118. In some embodiments, the business intelligence engine 118 can connect to the data store 108, the mapping engine 110, the customer compression engine 112, the objectives database 114, and the user interface 120. The business intelligence engine can measure and present the effectiveness of various product offerings for moving a customer through a product space. In some embodiments, the business intelligence engine can construct data for use in visualizations of product maps and customer maps, as well as analytics representing the results and effectiveness of campaigns for affecting the trajectories of customers moving through a product space. As described in more detail below in reference to FIG. 12-FIG. 14, the analytics produced by the business intelligence engine can include various types of segmentation analysis of different customer behaviors for various demographic groups.

In some embodiments, the system 100 can also include a user interface 120. The user interface 120 can connect to the data store 108, the objectives database 114, the persuasion engine 116, the business intelligence engine 118, and computer system 124, which incorporates a display that can be utilized by a user 126. In some embodiments, the user interface 120 can produce and display interactive visualizations of product maps, customer maps, and data analytic charts for presentation to the user 126 using data obtained from the data store 108, the objectives database 114, the persuasion engine 116, and the business intelligence engine 118. The user interface 120 can also provide functionality for the user 126 to navigate the product maps, customer maps, and data analytic charts presented on the display of the computer system 124. Examples of the visualizations produced by the user interface 120 are described in more detail below in reference to FIG. 5-FIG. 14. In some embodiments, the user interface 120 can provide functionality for allowing the user to define various business objectives to be stored within the objectives database.

In various embodiments, the system 100 can also include a recommendation interface 122. The recommendation interface 122 can connect to the persuasion engine 116 to receive information related to recommended actions to be taken by an external system, such as external server system 128. The recommended actions can be taken when contacting customers regarding selected product offerings designed to move customers through the product space in a desired direction. The recommendation interface 122 includes appropriate application programming interfaces to allow external systems to automate the submission and retrieval of information regarding customer offerings targeted to move a customer through a product space according to a business objective. The recommendation interface 122 also includes appropriate functionality to feedback data into the interaction data source for use in the creation of further product space geometries and customer models.

Various embodiments generate a data space and illustrate the behavior of people within the data space. The data space may be constructed by adapting various concepts from fourpoint probe (FPP) testing to a network with directions (NWD). This gives rise to a pseudometric on the vertices of the NWD where the pseudometric differs from a metric only in that the distance between two non-identical points can be zero. The pseudometric behaves much like the hyperbolic metric and facilitates the definition of geodesic bundles on the NWD, which behave much like geodesics in models of hyperbolic space.

A NWD is a network with a privileged subset of vertices called directions which are denoted as $\partial^\infty$. The complement of $\partial^\infty$ is denoted as H. In some instances, the directions of the NWD can be thought of as a natural boundary of the system (the notation purposely recalls that of the upper half-plane model of hyperbolic geometry). In other instances, the directions have a natural interpretation as a set of directions for orientation which can provide an interesting and useful heuristic for navigating the network. Note that in some cases, the directions already come as vertices in the space. In other situations, we may be required to create a new vertex to encode a direction. We also assume that the NWD has a weight (adjacency) matrix W from which a Markov chain can be formed with transition matrix P formed by normalizing the row sums of the weight matrix W to be one. We further assume that for a NWD this chain is ergodic.

A NWD has a natural pseudometric that can be derived from FPP testing (e.g., an engineering tool used to find imperfections and cracks in materials). Roughly, the FPP works by using a battery to create charges of +1 at a point q and of −1 at a point p, and then using a probe to measure the potential difference between two other points b and a which we denote as [p, q; a, b]. The FPP may be realized on a NWD (or in any setting where the definition of a potential makes sense), and can be used to explore the NWD's geometry.

The distance $d_{fpp}$ defined by the FPP is such that given a pair of points p, q $\in \partial^\infty$ then for any points a, b$\in$H we have $$d_{fpp}(a,b) = \max_{p,q \in \partial^\infty}[p,q;a,b] \quad (1)$$

The distance $d_{fpp}$ forms a pseudometric and behaves mathematically in many ways just as we would expect a discretization of the hyperbolic metric to behave. Given a disk in the Riemann sphere, the construction of $d_{fpp}$ with the FPP yields the hyperbolic metric in the disk and forms the familiar model of the hyperbolic plane known as the Poincare disk. We call the NWD with $d_{fpp}$ the FPP geometry on the NWD.

Figure 18B:
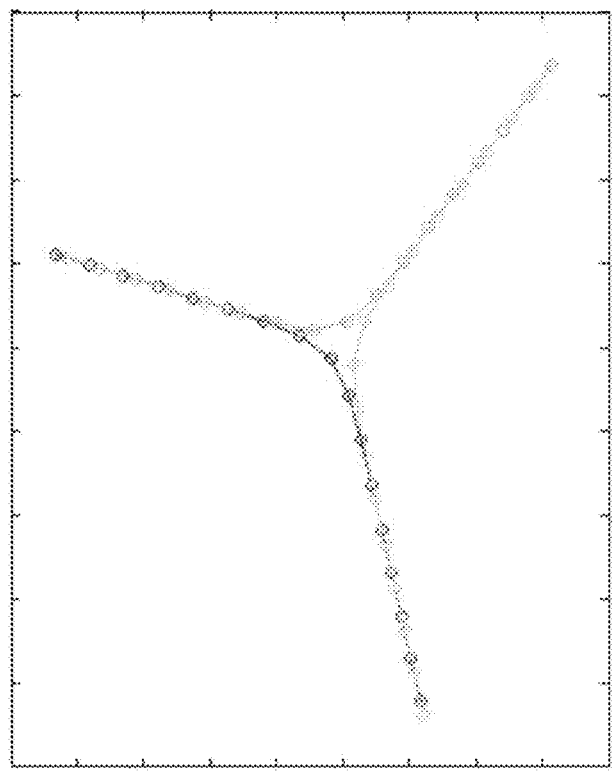
FIG. 18B illustrates multidimensional scaling (MDS) embedding of the triangle.
Figure 18A:
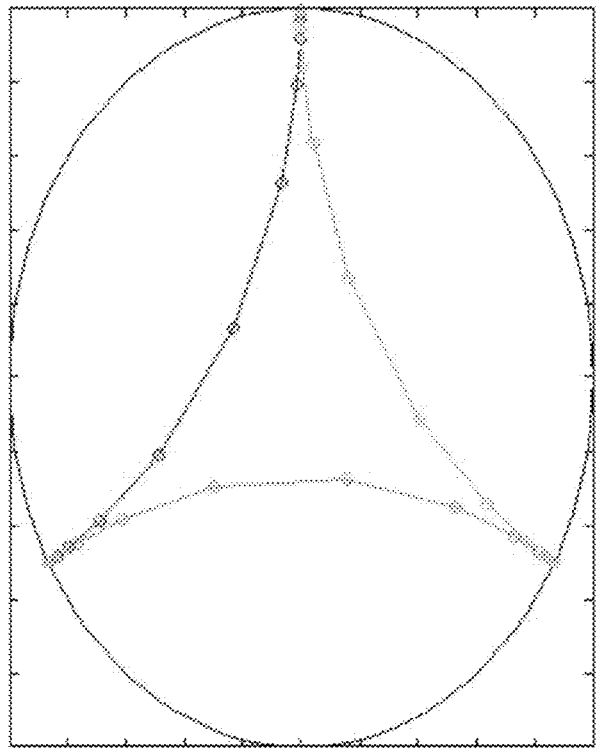
FIG. 18A illustrates an ideal triangle in the conformal Poincaré model.
Figure 19B:
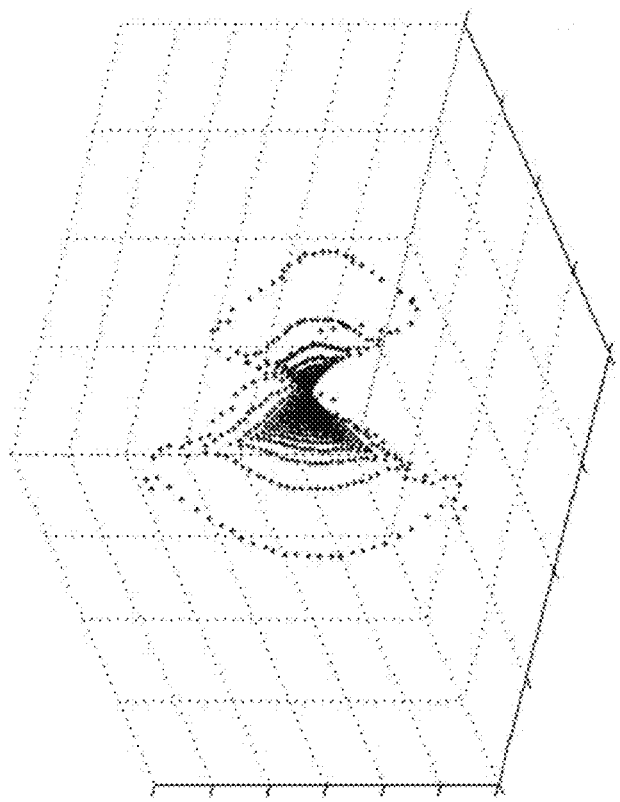
FIG. 19B illustrates the three-dimensional multidimensional scaling (MDS) embedding of a hyperbolic metric.
Figure 19A:
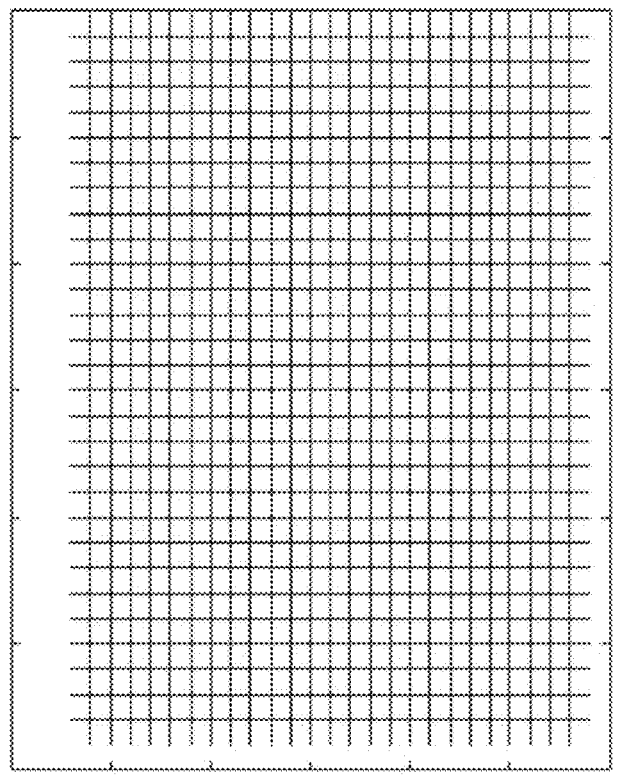
FIG. 19A illustrates a square grid with the boundary of vertices of the grid.

For visualization of a NWD, we will use multidimensional scaling (MDS) applied to $d_{fpp}$ matrix of vertices in the network to embed the vertices in a Euclidean space. The MDS construction aims to preserve distances as best as possible, while the Poincare model preserves angles but badly distorts distances. To gain some intuition consider FIGS. 18A and 18B illustrating the difference in appearance of a truncated (i.e., necessarily not extended out to infinity) ideal triangle in the Poincaré model (in FIG. 18A) that we use for our schematics, and what that triangle looks like if we embed the indicated points using the hyperbolic distances via MDS (in FIG. 18B). FIG. 18A illustrates an ideal triangle in the conformal Poincaré model while FIG. 18B illustrates MDS embedding of the (truncated) triangle with indicated points on the triangle's boundary embedded respecting distance. The relevance is that to embed our networks we use the $d_{fpp}$ metric and the MDS into a Euclidean space, and as such our representations will be attempting to mimic the distances (as best as possible) and not the angle as is the case in the more familiar Poincare and upper half space representations of hyperbolic geometry. For comparison, in a second example, we consider a simple NWD given by the square grid network with boundary (directions) shown in FIGS. 19A and 19B. FIG. 19A illustrates a square grid with obvious boundary given by the collection of vertices with less than four neighbors. Therein, we assign unit weights to the edges and let $\partial^\infty$ be the set of vertices connected to fewer than four other vertices (the obvious boundary of vertices of the grid) so that H comprises the remaining (interior) points. FIG. 19B illustrates the three-dimensional MDS embedding of the hyperbolic metric $d_{fpp}(x,y)$ on the chain with $\partial^\infty$ given by the boundary. Notice the saddle point structure of the embedding, consistent with a hyperbolic geometry.

For our needs, the most important construction in hyperbolic geometry is that every ordered pair of points a and b determines a unique oriented geodesic from a to b which can then be extended to hit a unique pair of points in $\partial^\infty$. More precisely, calling this unique pair of points at infinity p(a,b) and q(a,b), they are determined by $$(p(a,b),q(a,b)) = \arg\max(\max_{p,q \in \partial^\infty}[p,q;a,b]) \quad (2)$$

Conversely given a pair of directions p and q$\in \partial^\infty$ then we can consider the sets of pairs of points in H that give rise to them:

$$\Gamma_{p,q} = \{(a,b) | (p(a,b),q(a,b)) = (p,q)\} \quad (3)$$

Figure 20:
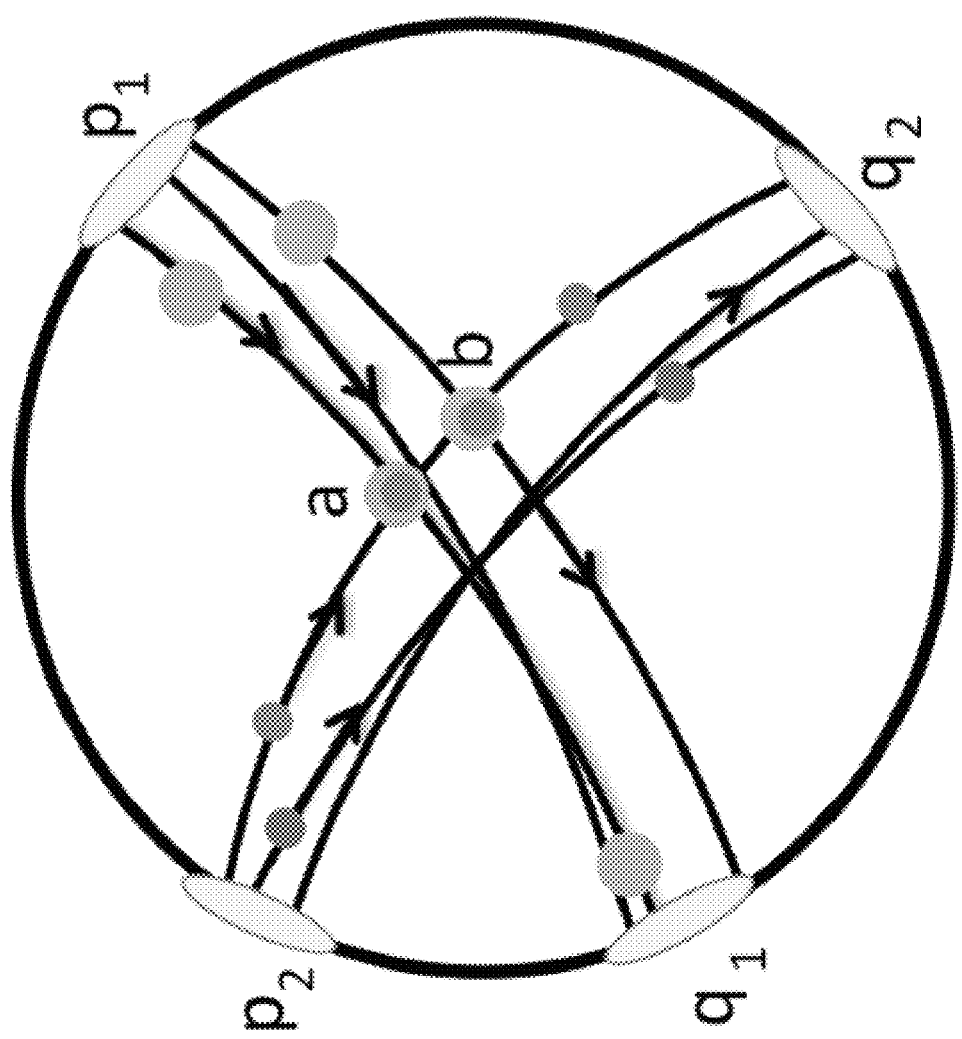
FIG. 20 illustrates the notion of an oriented geodesic bundle in a schematic.

While in the case of hyperbolic space $\Gamma_{p,q}$ would be a unique geodesic, our NWD behaves like a discretization of hyperbolic space, so a vertex at infinity is effectively like a subset of points at infinity in hyperbolic space. Thus in the NWD case we obtain a geodesic bundle, $\Gamma_{p,q}$, of oriented geodesics that connect from points in p to points in q. That is, $\Gamma_{p,q}$ is not necessarily itself a single geodesic. Our use of the term bundle is more closely aligned with its use in relativistic cosmology versus the more common mathematical use of the term (e.g., tangent bundle) from geometry. FIG. 20 illustrates the notion of an oriented geodesic bundle in a schematic. In FIG. 20, (a, b)∈$\Gamma_{p2,q2}$, but, although there are points in the form (*, a) and (*, b) in $\Gamma_{p1,q1}$, we see that (a, b) is not in $\Gamma_{p1,q1}$.

Some facts that would apply to geodesics in hyperbolic geometry still hold for our geodesic bundles $\Gamma_{p,q}$ in a NWD. For example we have the consistency relation that if (a,b)∈$\Gamma_{p,q}$ and (b,c)∈$\Gamma_{p,q}$ then (a,c)∈$\Gamma_{p,q}$ which one would expect for oriented geodesic bundles. On the other hand, since we are dealing with geodesic bundles and not geodesics, if (a,b)∈$\Gamma_{p,q}$ and (c,d)∈$\Gamma_{p,q}$ then there is no reason for (a,c) or (c,a) to be in ∈$\Gamma_{p,q}$.

The previously described methods to generate a data space may be readily applied to products to create a product space. In various embodiments, the points within the product space can be connected by links that are representative of relationships between products in the product space. The combination of data points representative of products, links representative of product relationships, and directions within a product compass form a hyperbolic geometry of representing the global product space. Determining customer location within the product space involves the profiling of a customer, or set of customers, in terms of the products in the product space. By determining which products in the product space are most representative of a customer, the system can assign a customer a location within the product space. By using the customer's historical relationship to products in the product space, the profiles of customers having similar demographic descriptions, and the relationships between products that define the hyperbolic geometry of the product space, a customer trajectory can be determined. The customer trajectory is the most likely path through which the customer will traverse the product space. In the context of the hyperbolic geometry defining the product space, a customer trajectory can be defined as a geodesic path. A geodesic is an optimal path between two points in the associated hyperbolic geometry. A geodesic can be used to determine a high value path that moves a customer from where she is currently located within a product space to where a business would like for that customer to be. The geodesic connects the locations of origin and target points within the product space oriented to directions on the compass, and passes through intermediate points in the product space. These intermediate points are the products with which a customer will interact as they move between the origin and target locations in the product space.

Figure 2:
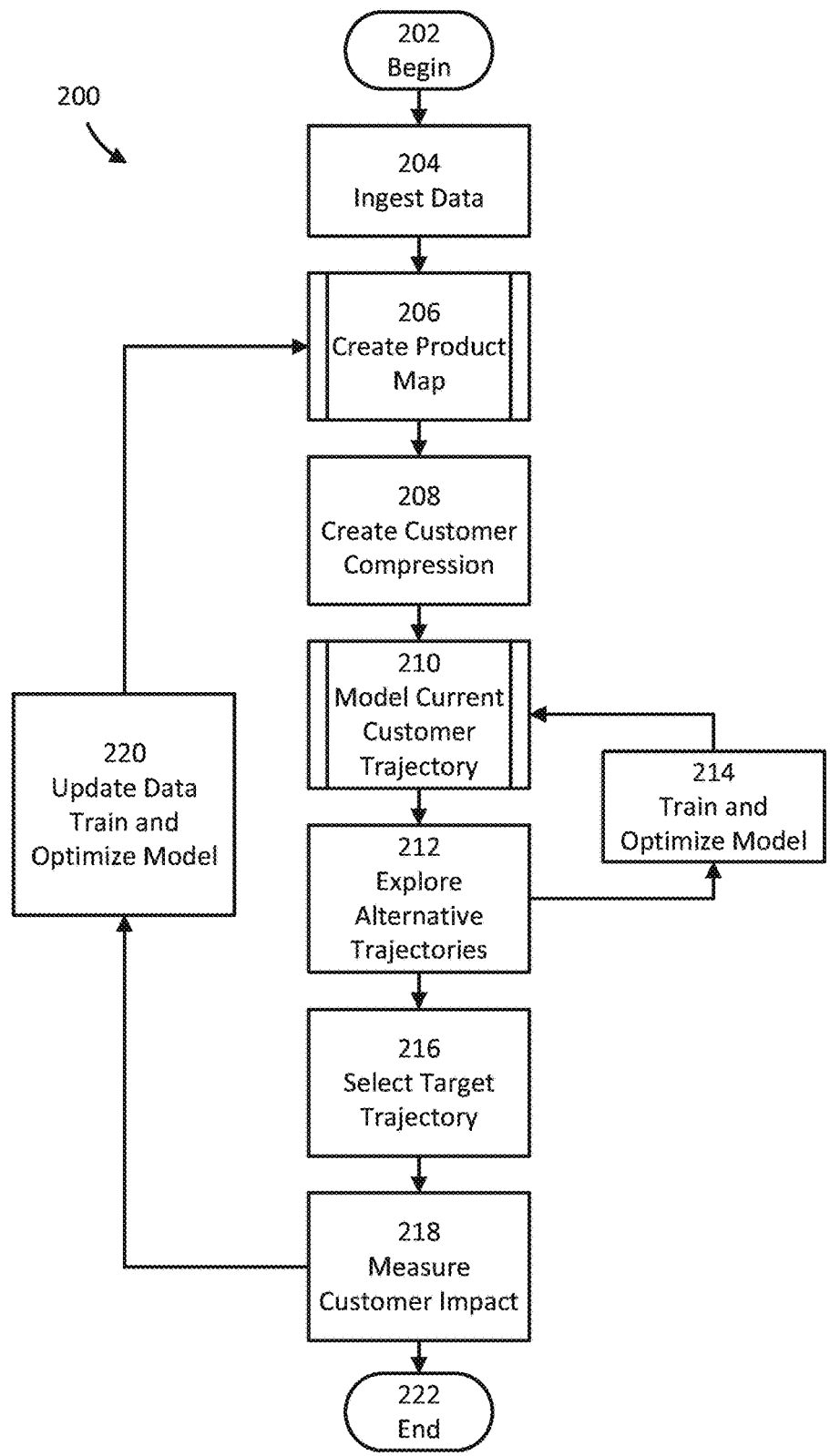
FIG. 2 illustrates an example process for modeling a customer within a product space and determining recommendations to influence customer movement through the product space.

An example process 200 for the overall operation of mapping a product space, as well as modeling and influencing a customer's location and path through a product space is depicted in FIG. 2. The process 200 begins with act 202. In act 204, the data store 108 ingests data from the customer data source 102, product data source 104, and interaction data source 106. The data stored within the data store 108 may be stored in a variety of manners so as to be accessible to each of the components that connect to the data store 108.

In act 206, the mapping engine 110 pulls product information, customer information, or interaction information as needed from the data store 108 to produce a product map representing the product space. Product maps are comprised of nodes that represent the various products in the product space, links between those nodes that represent the existence, strength, and possible directionality of relationships between products in the product space, as well as a product compass that provides global orientation for the product space. Factors affecting the links between nodes are based on similarities that define the local geometric relationships between individual products. The definition of product similarities is discussed in more detail below in relation to FIG. 3.

As part of determining a product map for a product space, the mapping engine 110 also builds a product compass that provides a global orientation for the products in a product space. As described in more detail below in relation to FIG. 3, the creation of a product compass associates the local geometries of product relationships defined by similarities between products with a global geometry of product relationships aligned with overall business objectives. Example product maps are described below in relation to FIG. 5-FIG. 11B.

Figure 3:
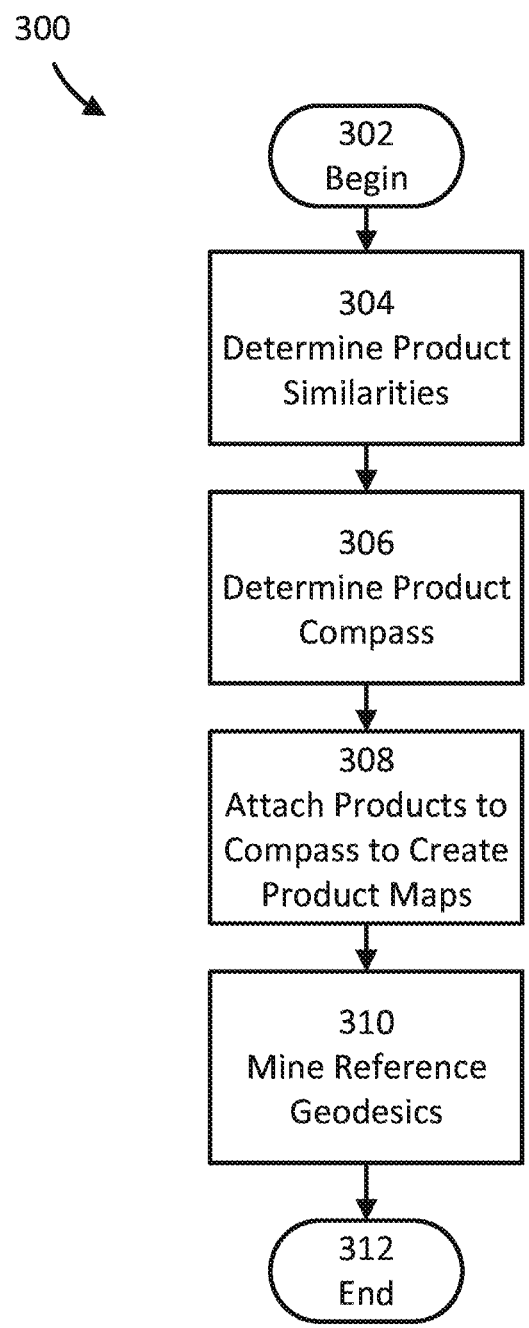
FIG. 3 illustrates an example process for creating a product map.

As described in more detail in relation to FIG. 3, the process of creating a product map involves defining the local geometries of a product space based on the determined similarities between products in the product space, defining the compass that represents the boundaries of the product space, and linking the local geometries of the product space defined by the similarities to the product compass. In various embodiments, the mapping engine 110 can save the resulting product map data and customer map data to the data store 108 for later use by other components within the system.

In act 208, the customer compression engine 112 processes customer data, product data, and interaction data to create a customer compression that can be utilized to represent the customer within the product space. Creating a customer compression can involve analysis of historical time series of customer-product interaction data, comparison of individual customer data to segmentation data of customer populations, and determination of product category fingerprints that place an individual customer or set of individual customers at locations within a product space. In various embodiments, the customer compression engine 112 can save the resulting customer compression data with the data store 108.

In one example of a customer compression, a customer compression can be created within a department store setting. For this example, a set of parameters, denoted Pk, can be numbers which a customer model includes that are capable of being trained by included feedback and training functionality, such as the functionality provided by the persuasion engine 116. In this example, a value for Pk months could be 6 months. In this example, there can also be parameters that are outside control of the model for which values can be explicitly assigned. In this example, a set of customer data 102 includes partially labeled peer attributes including gender, age and zip code. Also in this example, the interaction data 106 includes 5 years of purchase history information including the product purchased and date of purchase. This particular example also incorporates product data 104 that includes current product availability and the product's place in a key product hierarchy, relative to the compression, in the form: {[Department1,[Brand11, . . . Brand1N], . . . }. A customer compression engine 112 can include cross system product analysis with regard to peer attributes. For example, the analysis could find the likelihood ratio of a product being purchased by a woman instead of a man as LR=((Number of women purchasers)/(Number of women))/((Number of men purchasers)/(Number of men)). This measure of likelihood ratio is utilized in the simple customer compression model discussed below.

In this example, a customer compression produced by the customer compression engine 112 can include transactional attributes, such as the products a particular customer purchased and the dates on which those products were purchased. This example customer compression can also utilize segmentation attributes such as an educated guess at gender of the purchaser. Such an educated guess can be made for female purchasers if there are products with LR>P10, none with LR>P11, and for male purchasers if there are products with LR<(1/P10), none with LR>(1/P11), and unknown otherwise. In this example a learning model could also be used to determine the gender of the purchaser. In this example customer compression, customer traits can also include age range, region, engagement (which can be defined as transactions per month in the last P1 months), a department fingerprint, a brand fingerprint for each department in the department fingerprint. In this example, a department fingerprint can be defined as the top P3 departments associated to the highest likelihood of the customer visiting the department relative to a random customer, where the top P3 departments are those that exceed a minimal likelihood threshold P4, and where the highest likelihood department is called the maximally associated department. In this example, a brand fingerprint can be defined as the top P5 brands associated to the highest likelihood of the customer purchasing the brand relative to a random customer in that department, where the top P5 brands are those that exceed a minimal likelihood threshold P5 for each department in the customer's department fingerprint. The brand with the highest likelihood is called the maximally associated brand.

In act 210, the persuasion engine 116 can encode the interaction of the customer compression created by the customer compression engine and the product map information representing the product space to determine model customer trajectory, also referred to as customer momentum, which represents the customer's current path through the product space. The customer trajectory is a geodesic within the hyperbolic geometry representing the product space that connects the current position to a goal position. A customer trajectory combines a customer compression with the direction point on the product compass most closely associated with that customer compression to determine the customer's most likely path within the product space. The customer trajectory is aimed at a second direction point on the product compass which acts as the target location. The geodesic representing the customer trajectory is a hypothetic trajectory with regard to the map objective that highlights the sequence of products within a product space to which a customer can interact in proceeding towards a goal. The customer trajectory determines the customer's most likely next step in their journey through the product space. By connecting multiple points within the product space, the customer trajectory provides insight into the long term business impact associated with the products with which a customer is most likely to interact throughout the product space.

In act 212, the persuasion engine 116 can explore possibilities for alternative customer trajectories within a product space. In some embodiments, the persuasion engine 116 can test the effects of introducing offers to a customer that influence the customer to move along an alternative path through the product space. In determining potential product recommendations to present to a customer, the persuasion engine 116 can take into account business objectives stored within the objective database 114.

It is appreciated that, in some embodiments, alternative customer trajectories may include identified steps that the customer is less likely to select than other unidentified steps, for example where the identified steps bring the customer closer to the goal position than the unidentified steps. For instance, the persuasion engine 116 may reference one or more parameters that cause it to weigh these identified steps differently (e.g., more heavily) than the unidentified steps.

In act 214, the persuasion engine 116 can test the effect on customer trajectory of a variety of different product offerings. The testing of different product offerings provides optimization and training functionality that can help determine the highest value path a particular customer might take through a product space. In some embodiments, the testing performed by the persuasion engine can involve the introduction of various test customer groups or test product groups that may affect the customer compression or underlying product geometry. In various embodiments, parameters representing various test customer groups can be modified to determine the effect on customer compression and customer trajectory. In other embodiments, parameters representing portions of product maps, such as local geometry similarity data or product compass data, can be altered by the persuasion engine 116 to test the resulting effect on customer trajectory.

In act 216, the persuasion engine selects a target trajectory and associated initial product offerings to present to a customer in an attempt to persuade the customer to move along the target trajectory.

In act 218, the business intelligence engine measures the impact of the contact made with the customer in relation to the selected target trajectory. In some embodiments, the business intelligence engine 118 can perform analytics on data related to the effects of contacts a business makes with a variety of different customer segments over a predetermined time period or with a predetermined set of products. In various embodiments, the business intelligence engine 118 can perform categorical measurements over multidimensional space of demographic categories. In various embodiments, results of the analytics performed by the business intelligence engine can be incorporated into graphical displays of these categorical measurements. Example analytic displays of information are discussed below in relation to FIG. 12-FIG. 14.

In act 220, measurements taken by the persuasion engine 116 and business intelligence engine 118 can be written to the data store 108 for use in the creation of future product maps, customer compressions, and customer maps. In some embodiments, the measurements taken by the persuasion engine 116 and business intelligence engine 118 can also be used for updating business objective information and map objective information stored with the objectives database 114. In some embodiments, the data written back to the data store can be used to refine, train and optimize the creation of product maps, customer maps, and customer models, as well as business objectives and map objectives.

Process 200 ends with act 222.

As discussed above with regard to act 206, various embodiments provide processes for creating a product map from a data set of products within a business's product catalogue. FIG. 3 illustrates one such process for creating a product map from a set of product data with a business's product catalogue. Process 300 begins with act 302. In act 304, the similarities between products are determined using one of a variety of techniques. In some embodiments, the similarities between products can be inferred directly based on the products themselves, such as using pre-existing categories into which products have been assigned or by textual processing of existing product descriptions. In various embodiments, product similarities within a product space can be inferred from existing data related to customer interaction with a set of products, such as the information obtained from the interaction data source 106. In some embodiments, product similarities can be obtained from various external data sources, such as product review information, inventory management data systems, social media sentiment analysis sources, and a variety of other sources including information about products in a business's product catalogue. In some embodiments, product similarity information can be determined using a combination of any or all possible data sources containing information about a business's customers, products, and customer-product interactions. In various embodiments, monotonic transformations can be applied to the similarity data so as to scale the relationships between products in the product space, while preserving overall order of products in the product space. As mentioned previously above, information about product similarities is used in determining the local geometries for products within the product space.

As an example of a monotonic transformation, in the context of the department store example discussed previously, there are parameters, denoted Pk, that are numbers for which the customer model can be trained by the system 100. In that example, a simple similarity between products that is derivable via the interaction data 106 could be used to measure the likelihood that a pair of customers have a second product given that they have a first product relative to a random customer. In this example, a first weight value 1 can be assigned if this likelihood is greater than P0, and second weight value 0 can be assigned otherwise.

In act 306, information related to product categories and product value information can be utilized to create a product compass. A product compass can be used to provide the data within a product space with a global orientation. A product compass includes points, called directions, within the product space that can represent product categorizations, as well as information about product-customer interaction. In some embodiments, direction points within the product compass can be defined by product categorizations such as brands, types, themes, vertical markets, and other types of categories. In various embodiments, the creation of a compass based on categorizations can be performed when a business has an objective to expose customers to different parts of its product catalogue, corresponding to different areas of the product space. In other embodiments, a product compass can be created based on customer-product interactions, such as sales margin of profit or various customer loyalty metrics, where the business objective is to expose the customer to areas of the product space having high business value. In various embodiments, the method used for creating a product compass associated with a product space can included weighted combinations of any or all of the possible individual methods for creating a product compass for a product space.

Returning to the context of the department store example discussed previously, there can be included parameters, Pk, for which the model is capable being trained. In this particular example, the goal for engagement with customers can be to both expose the business's value proposition and to diversify the customer's exposure to the product catalogue. In order to accomplish this goal, directions can be defined with regard to customer loyalty per department fingerprint. In one implementation of this example, one method for performing this definition is for each department and each customer with a department fingerprint in the particular department to define a loyal customer. FIG. 15 depicts one interface that can be used for defining a loyal customer. In this user interface 1500, an initial setting is selected of "Made first purchase more than 119 days ago" 1502, "Makes a transaction more than 14 times per year" 1504, "spends more than $100.48 per year" 1506, and "Last had a transaction less than 575 days ago" 1508. These entries indicate parameters that can be trained on data received by the system. In this example, the process used to determine loyal customers can be repeated for determining "unlikely to be loyal" customers. Upon determining categories of loyal and unloyal customers, products can be determined that are associated to loyal 1510 as opposed to "unlikely to be loyal" customers 1512, and the interface 1500 can include cutoffs on the likelihood values used to include products in these categories. In this example, this methodology can be used to assign a combined label [loyal/not, department] to a subset of the product space for defining the associated directions.

In act 308, the mapping engine 110 can attach the local geometries determined from product similarities to the defined product compass for the product space producing a product map. In some embodiments, the creation of product maps can involve a process of subset pairing between various local geometries within the product space. In particular embodiments, the creation of product maps can involve auto-scaling and rescaling a compass against local geometry similarities within a product space. In various embodiments, parameters associated with the attachment of products to a compass can be trained by the persuasion engine 116, as described above.

In act 310, the product map can be mined for reference geodesics to determine trajectories of high value within the product space. In some embodiments, the process of mining reference geodesics can identify geodesic paths that are associated with targeted customer segments.

Process 300 ends with act 312.

Figure 4:
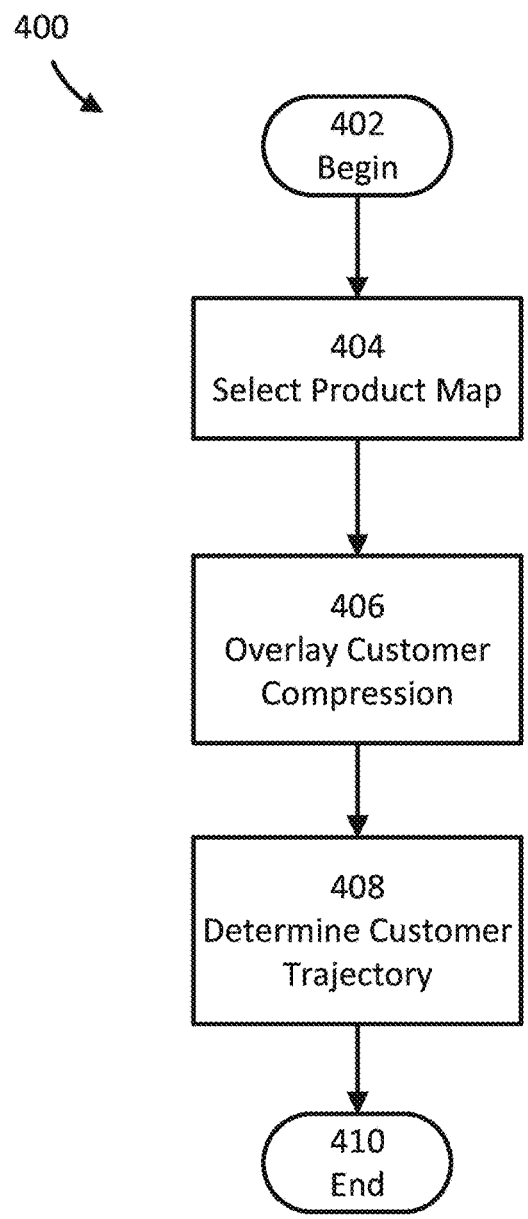
FIG. 4 illustrates an example process for modeling an individual customer's trajectory within a particular product space.

As discussed above with regard to act 210, various embodiments provide processes for creating a customer model and including current customer trajectory from the combination of a product map and customer compression data. FIG. 4 illustrates one such process for creating a customer model. Process 400 begins with act 402. In act 404, a current product map created by the mapping engine 110 and stored within the data store 108 is accessed by the persuasion engine 116. In act 406, a current customer compression created by the customer compression engine 112 and stored within the data store 108 is accessed by the persuasion engine 116 and is overlaid on the current product map. In act 408, the possible set of geodesic paths associated with the current customer trajectory is determined from the interaction of the customer compression and the product map. In various embodiments, the acts 404-408 can be performed simultaneously on the separate individuals in a set of customers whose customer compressions have been placed on the product map. In some embodiments, the overlaid customer compressions from sets of individual customers accessed in act 406 can be combined into a composite customer compression representing the set of customers. Having determined a customer trajectory for the current customer compression and product map, process 400 ends with act 410.

In the context of the department store example described previously, the goal was both to expose the business's value proposition and to diversify the customer's exposure to the product catalogue simultaneously. In this context, the forming of a customer trajectory with regard to this goal can include, as a first step, a ranking of departments by association to loyalty. This ranking is the same process by which products were ranked for display in region 1510. For this example, customer compression information can be used to select a method for choosing a trajectory. In this particular example, trajectories are formed for customers having at least one transaction, which art customers that have a department fingerprint. The geodesics associated to the directions p=[loyal, goal department] and q=[not loyal, primary department]. A reference product on geodesic with minimal average distance can be computed using the hyperbolic metric. A distance from the goal for any point on the geodesic bundle can be determined by the relationship:

$$\text{Distance\_from\_goal}(\text{product}) = (\max\_\{\text{geodesic bundle}\}\{V\_p\char`\^q(\text{product})\} - V\_p\text{-}q(\text{product})),$$

and where the trajectory can be the points on the geodesic bundle with:

$$\text{distance\_from\_goal}(\text{product}) \leq \text{distance\_from\_goal}(\text{reference\_product})$$

Having capability to determine the trajectory and the distance_from_goal as a function of product, appropriate methods can be defined for touching the customer. In this example, any local recommendation engine that scores product on the trajectory can be utilized to select from the top P1 products the products with the lowest distance_from_goal values. In this particular example, the likelihood of customers sharing any pair of customer segment attributes relative to random customer can then be computed. Subsequently, for each product, a maximum of these likelihoods among pairs of attributes can be found among pairs of attributes based on the customers defined by the customer compression. As a next step in this example, a restriction can be performed to include products where this maximum likelihood exceeds P1, and then among these products they can be ranked by product popularity.

Figure 16:
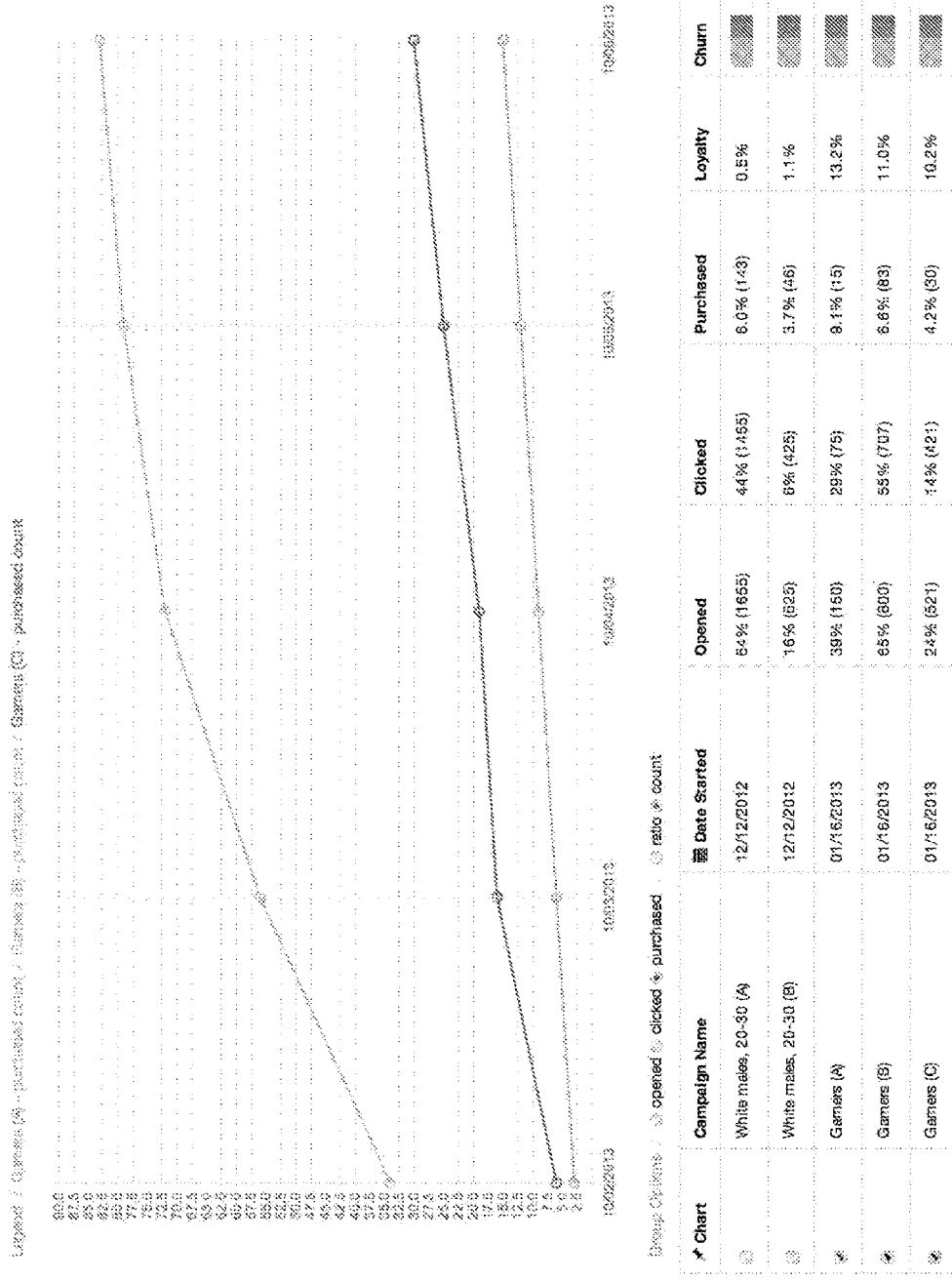
FIG. 16 illustrates another example user interface of analytics representing the results of influencing customers' movement through a product space.

In this example, once customers have been touched, the model and geometry can be trained with regard to objective functions related to the business's goals. This training can be performed by modifying the Pk parameters mentioned previously to improve the overall performance of the model. In the department store example, the continuance rate of purchases within a particular date range can be measure. Using this objective function, an online learning method can be used to update the model parameters. In this particular example, for each parameter being modified, an independent operation can be performed to split the population into three subsets and assign associated parameters (Pk+PK_Delta), (Pk-Pk_Delta), (PK). After touching the customers and measuring the objective function on each subset, the parameters can be updated according to the value assigned to the most successful subset. In this example, the exploration and evaluation of these parameter tests, as well as any A/B tests being tracked by the business, could be explored and evaluate in depth. FIG. 16 depicts one example interface for exploring and evaluating this type of data.

Figure 5:
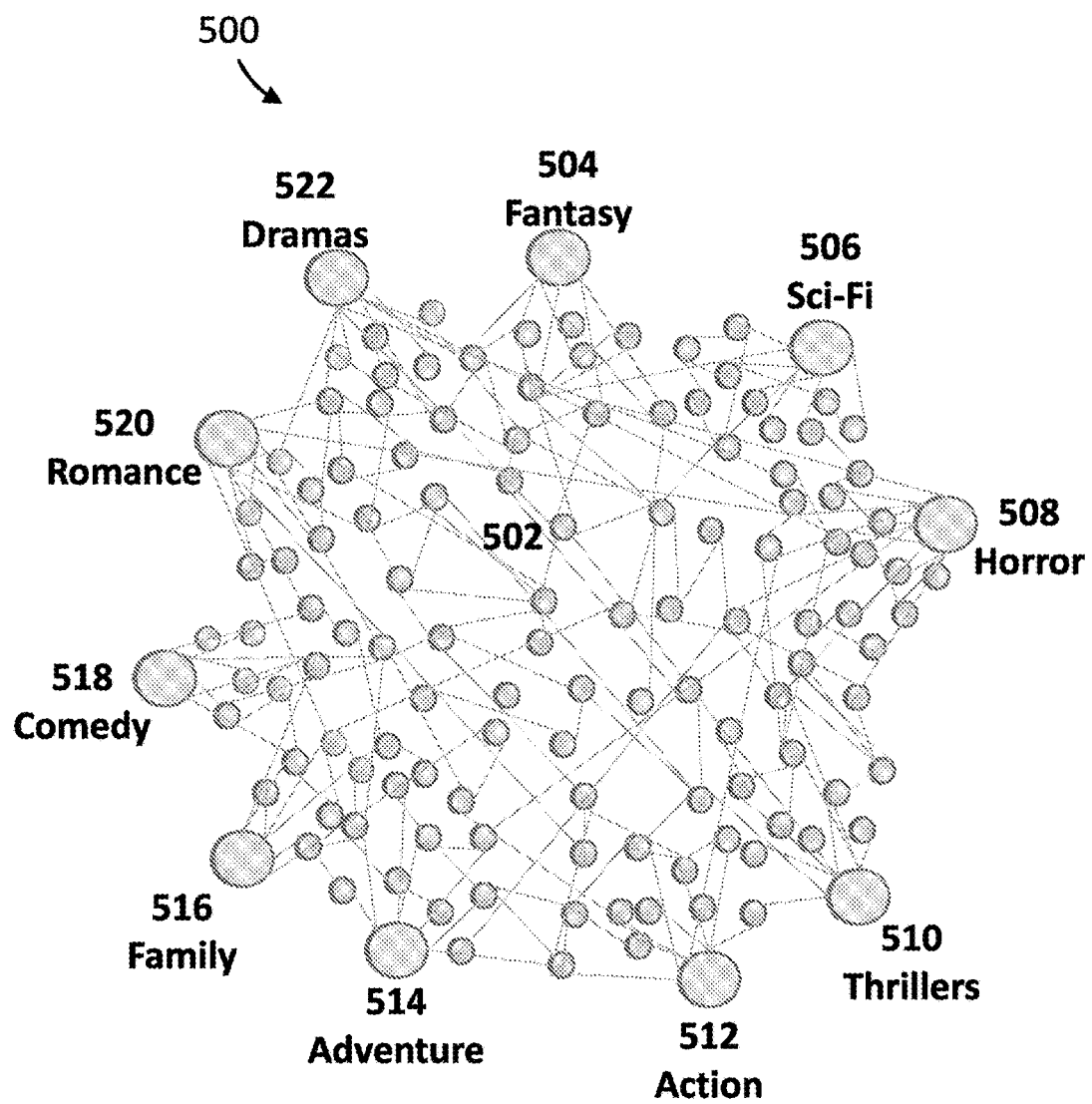
FIG. 5 illustrates an example product map.

FIG. 5 depicts an example product map 500 associated with a product space of movies. In this example, points 502 within the product space are connected via links that have been determined based on intrinsic movie characteristics (such as movie genre), editorial review information, as well as customer preference and customer viewing information. The directions points 504 through 522 represent various categories of movies within the product space and are themselves represented as points in the product space.

Figure 6:
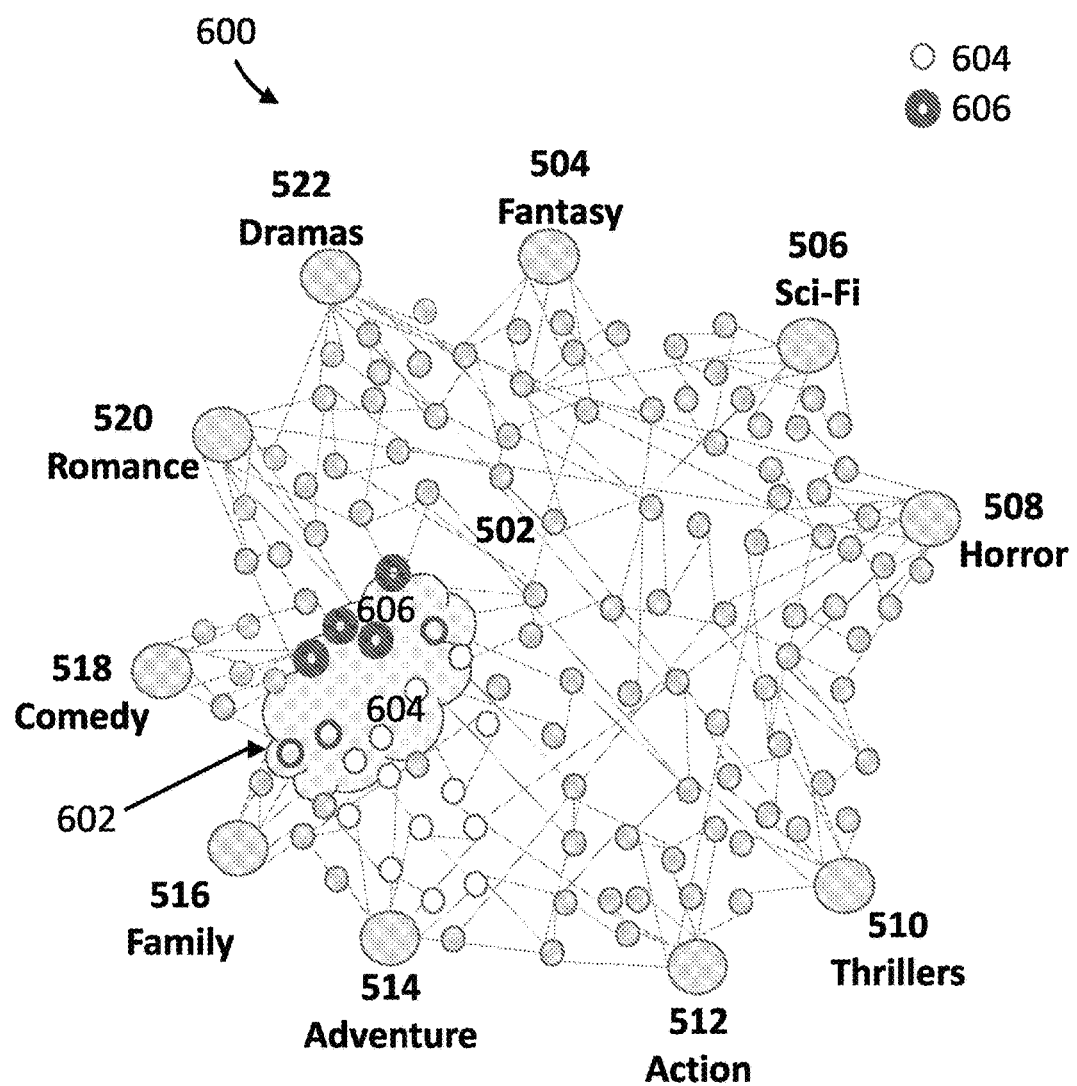
FIG. 6 illustrates an example customer compression positioned within a product map.

FIG. 6 depicts an example product map 600 incorporating the same movie product space as in map 500. In this example, a customer compression 602 is overlaid on the product map 600. The customer compression 602 contains representative product points 604 that represent movies within this particular customer's profile. The customer compression represents the tastes, opinions, and moods of individual customers that have coherence, in that those products fit to a current customer's profile. In this example, the manner in which a movie can fit with a customer's profile can be based on previous purchase or viewing history of a particular movie or a movie from a similar genre, or through a positive review of a particular movie by the customer or similar customers within the same demographic group. In this example, the customer compression also includes periphery points 606 that are possible next step points associated with the current customer trajectory.

Figure 7:
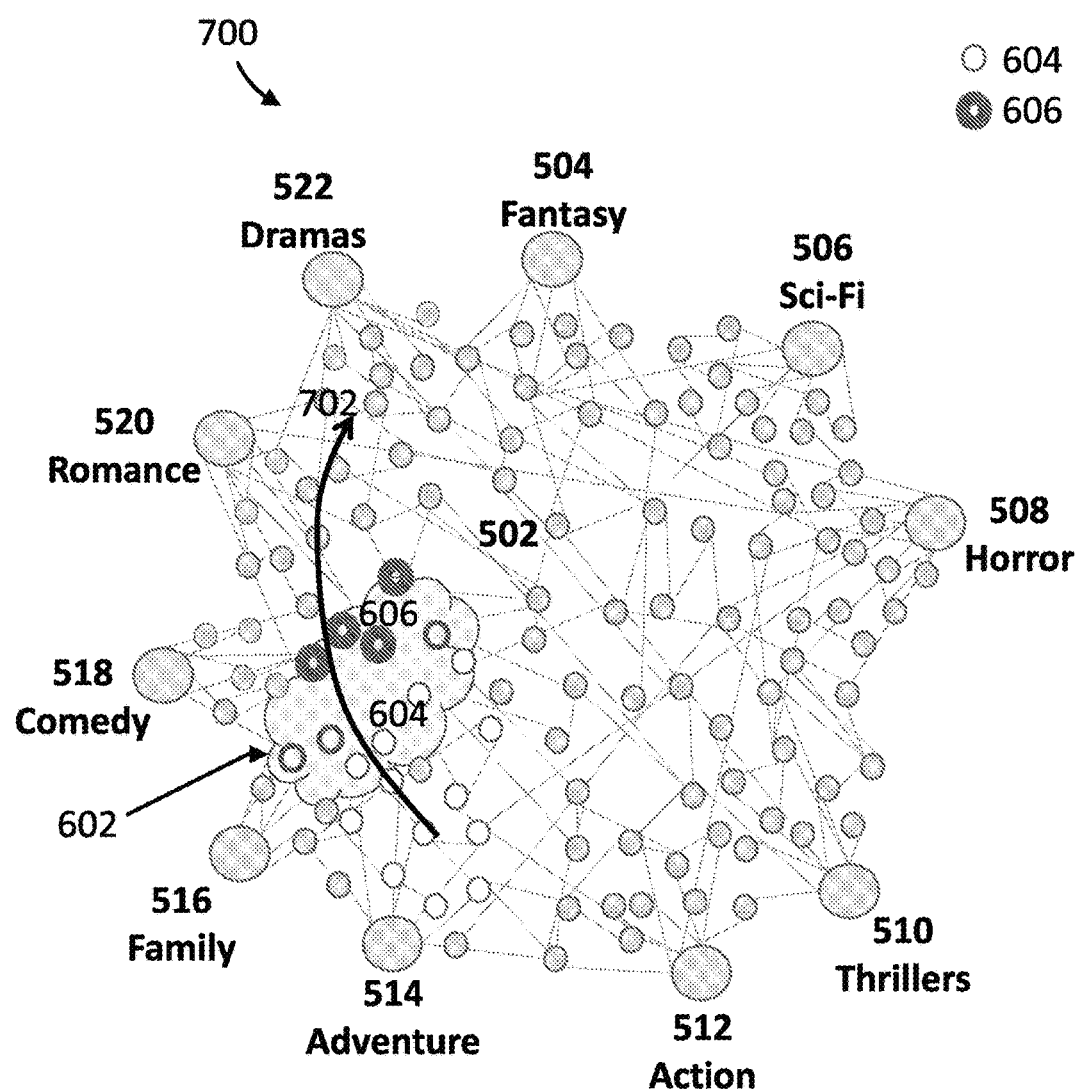
FIG. 7 illustrates an example current customer trajectory associated with a customer compression positioned within a product map.

FIG. 7 depicts an example product map 700 incorporating the same movie product space as in maps 500 and 600, as well as the same customer compression 602 overlaid on product map 600, but also includes a depiction of the geodesic 702 associated with the current customer trajectory. The geodesic 702 shows a path directed from the adventure movie direction point 514 pointing towards the current goal direction point 522. In this example, the customer compression 602 incorporates a set of product points, and the geodesic line 702 is a actually a weighted composite of individual geodesics produced from the current direction points 514 and 522 and the product points included in the customer compression 602.

Figure 8:
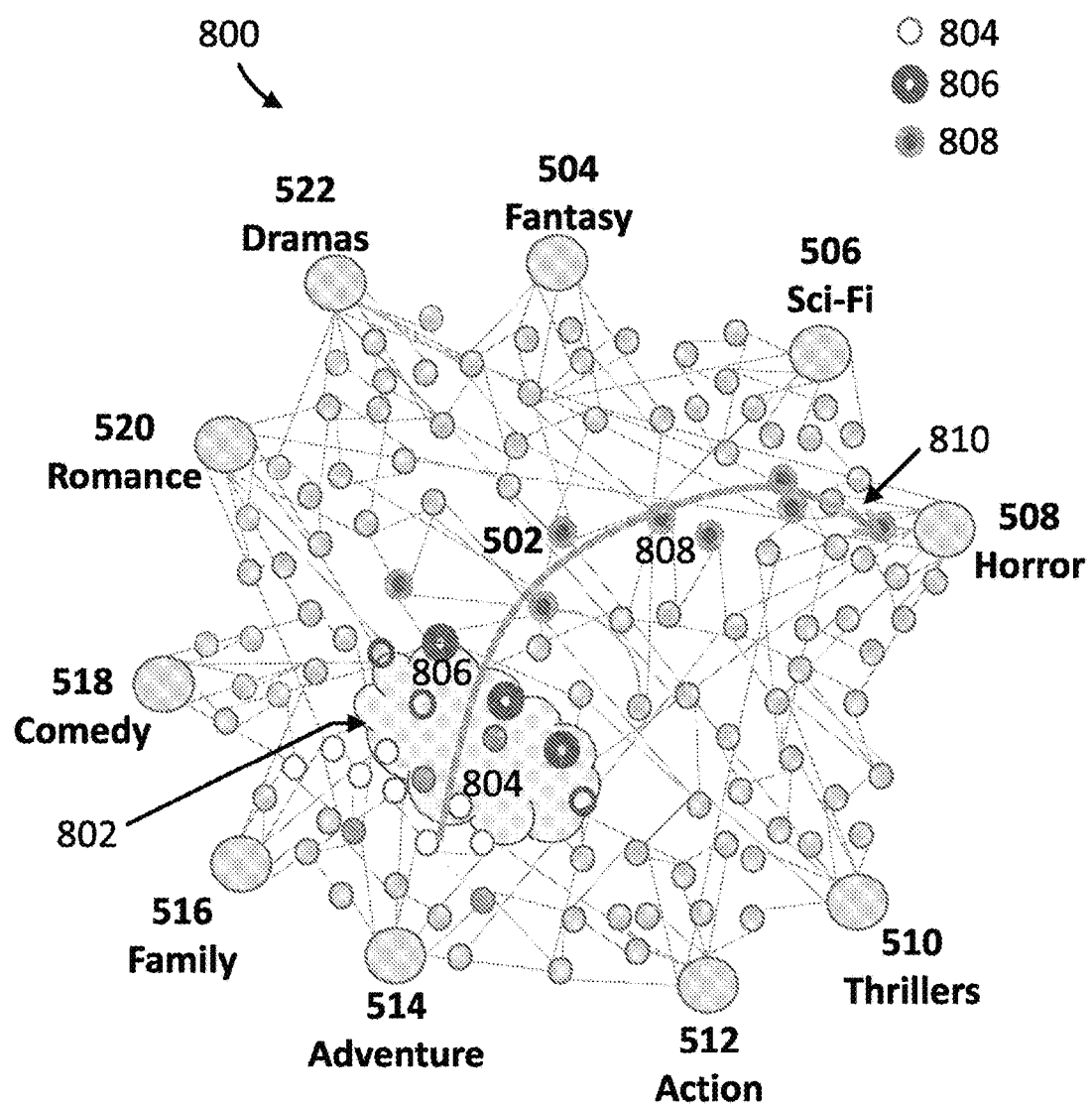
FIG. 8 illustrates an example alternative customer trajectory associated with a desired business objective for a customer compression positioned within a product map.

As discussed previously with reference to act 212, alternative customer trajectories can be determined that can direct a customer to a target location within the product space. FIG. 8 depicts one such alternative customer trajectory within a product map 800 composed of the same product points 502 as present in product maps 500, 600 and 700. In this example, the customer compression 802 is composed of the same basic product points 804 as in customer compression 602, but incorporates a separate set of possible initial product offering points 806. The product map 800 shows the main product interaction points 808 that produce the customer trajectory between the initial direction point 514 and the new high value target direction point 508.

Figure 9:
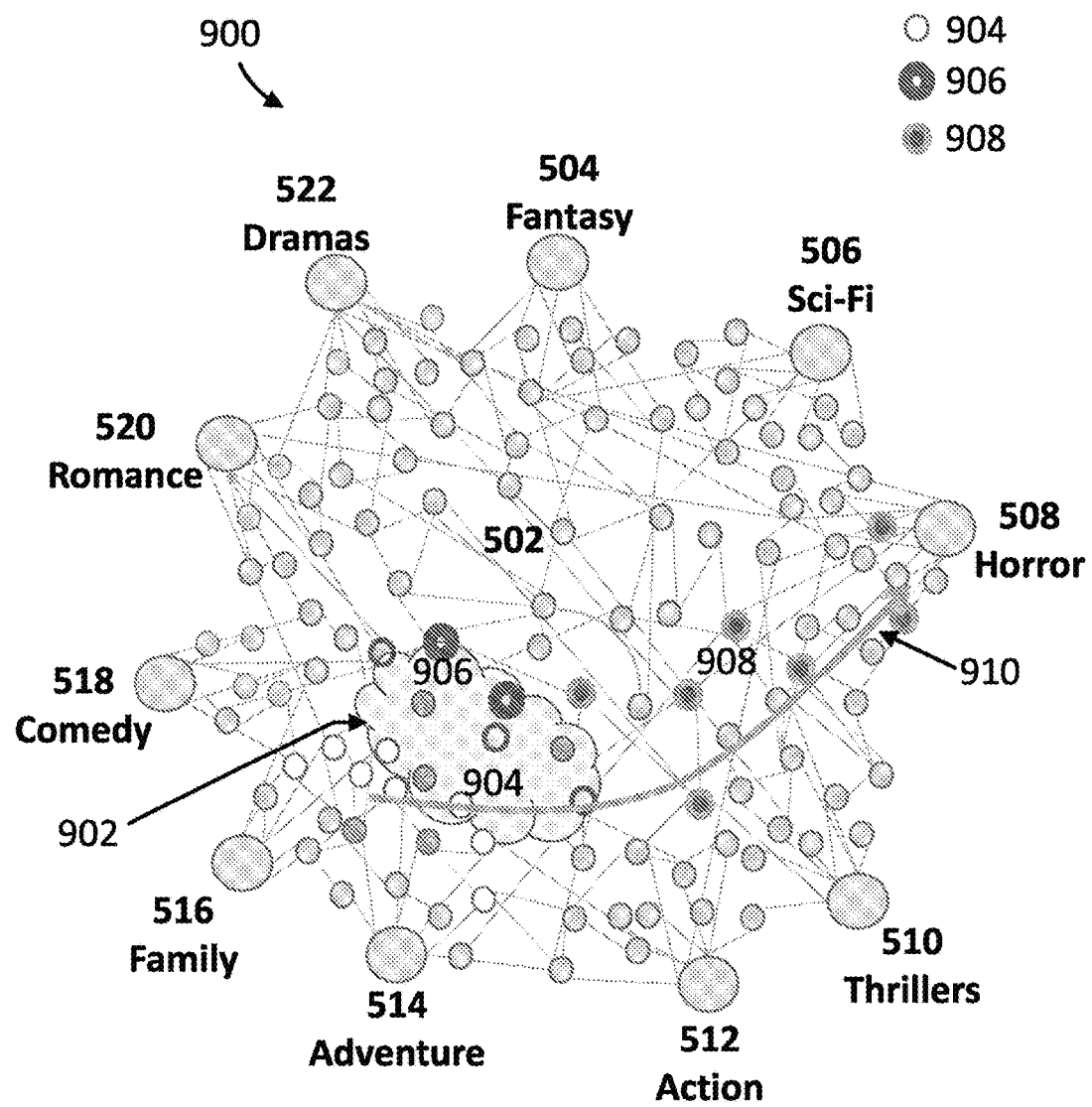
FIG. 9 illustrates an example alternative customer trajectory with associated with a desired business objective for a customer compression positioned within a product map.

As time progresses, people's tastes, opinions and moods can change leading to new customer compressions even in the face of the same underlying product space. FIG. 9 depicts one example of a new customer compression. As new product information, customer information and interaction information is incorporated into a new customer compression 902 comprised of product points 904 and offer points 906, a new set of likely next steps 908 can be associated with a new customer trajectory 910 that ultimately leads to the same target location in the product space as in product map 800.

Figure 10:
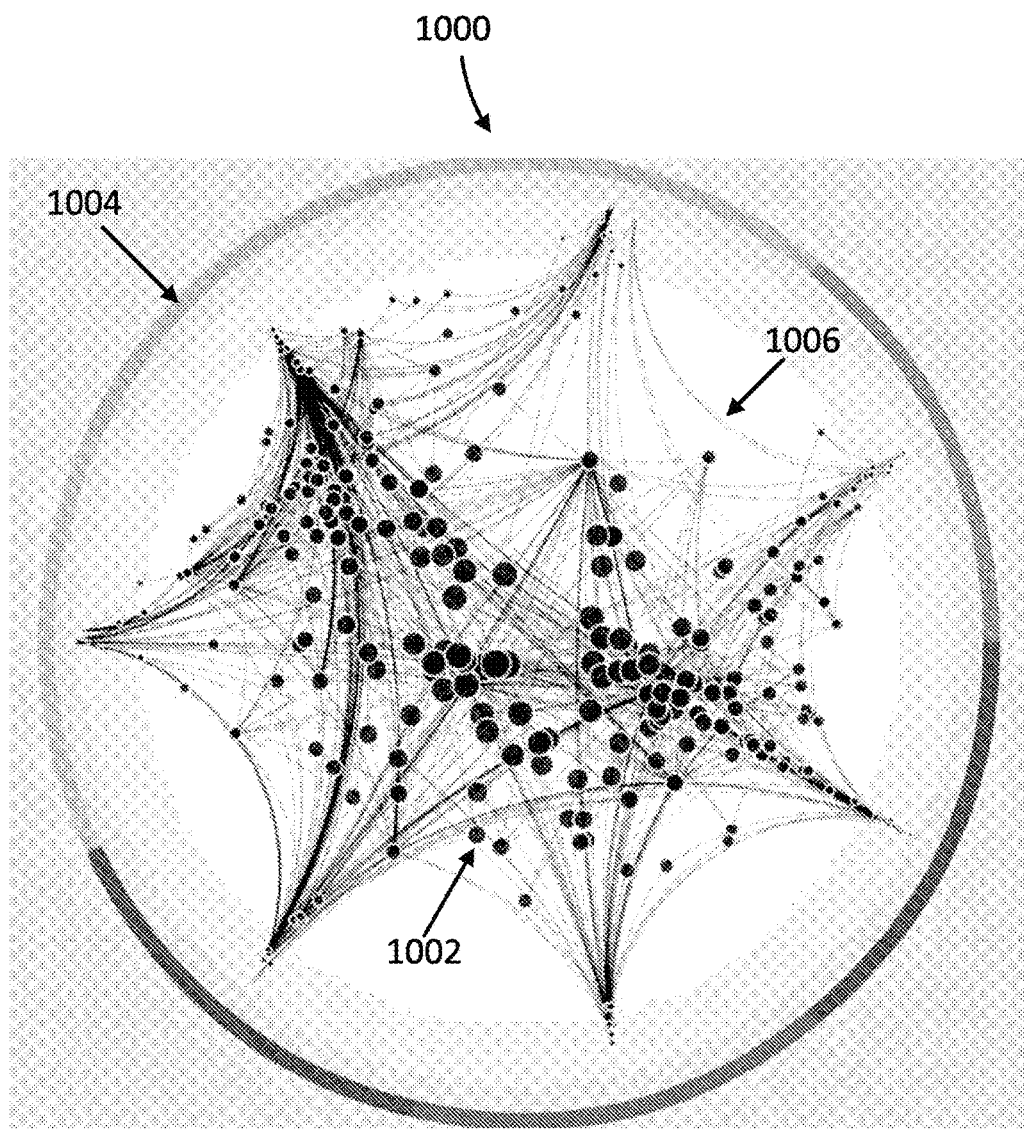
FIG. 10 illustrates an example user interface display of a global representation of a product map including a product compass overlaying possible geodesic paths through the product space.

In some embodiments, the user interface 120 can present an end user 126 a variety of product maps, customer maps, and analytical charts on the display of a computer system, such as computer system 124, an example of which is described below in more detail in relation to FIG. 15. FIG. 10 depicts one such example user interface representation of a product map 1000 that includes product points 1002 within a hyperbolic geometry space. The user interface 1000 also includes representations of geodesics 1006 between product points in the products space that point to various directions on the compass 1004. In the example 1000 of FIG. 10, the directions within the compass 1004 are depicted as discrete arc segments of the product space. In some embodiments, the direction points within such a compass can be discrete points as was shown in FIG. 5 through FIG. 9.

Figure 11A:
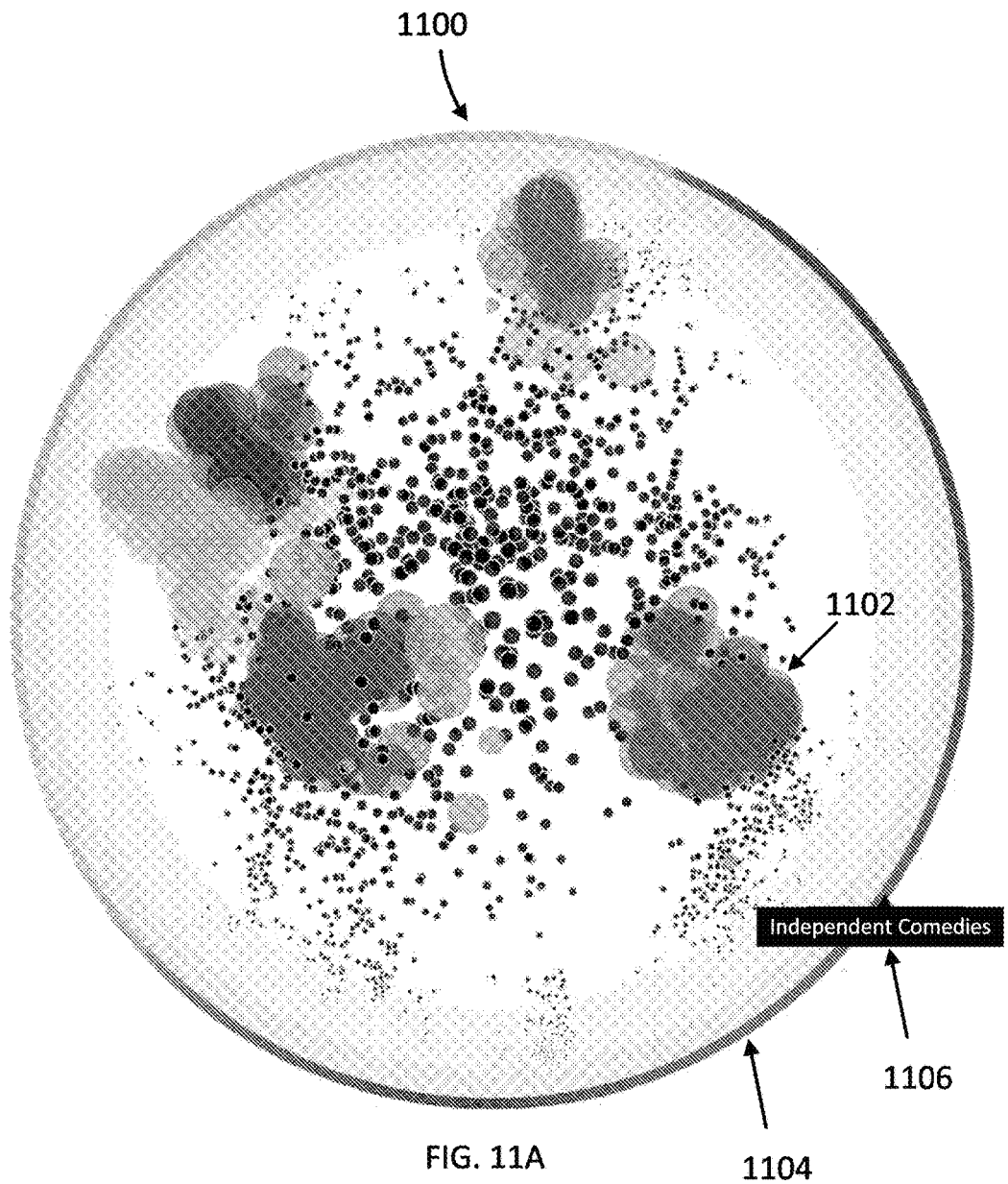
FIGS. 11A-11B illustrate an example user interface display of a customer placement on a product map and product compass representing a product space.

FIG. 11A depicts an example of a customer map 1100 showing various customer compression locations 1102 on a product space. In this example, the compass 1104 is represented by a smoother gradation of color change than the compass 1004 of FIG. 10. In this particular embodiment, that smoother gradation is representative of a larger number of directions present in the product compass. In some embodiments, the representation of the compass can be a smooth variation of colors from various color palates that may be supported by the user interface 120. In the embodiment shown in FIG. 11A, the user interface 120 can provide capabilities for user 126 to zoom in on the similarities within local geometry segments of the product space. In various embodiments, the user interface can provide features, such as the pop-up tool tip 1106, that provide specific information about the product point or compass point currently selected.

Figure 11B:
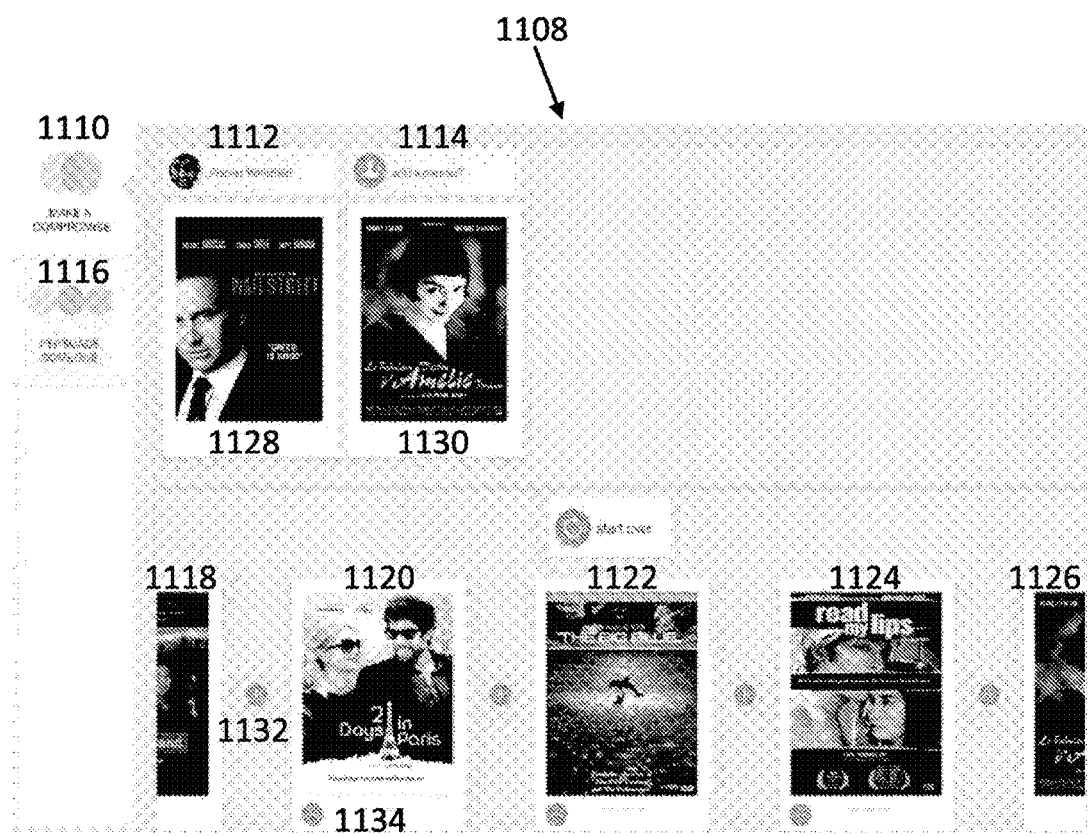

FIG. 11B depicts an example interface providing capability for mining the geodesics in a product space allowing for optimal choices within an explicitly represented product path. The interface 1108 of FIG. 11B provides capability for a user to "Make a Compromise" 1110 between two individuals 1112 and 1114, and to "Persuade Someone" 1116. In this example, when a compromise is being sought between two individuals 1112 and 1114, these individuals can be represented by separate customer compressions situated at separate locations within the product space shown in the product map 1000 and the customer map 1100. The data points from the geodesic connecting these two customers can be displayed explicitly within the user interface in a contextual manner appropriate to the products in the product space. In this example product space of movies, the path 1116 incorporates a set of distinct movies 1118, 1120, 1122, 1124 and 1126 that connect the movies 1128 and 1130 currently associated with the individuals 1112 and 1114. In this example, a user can interact with the user interface to alter the path through the explicit addition 1132 or deletion 1134 of movies from the presented path. This functionality for interaction with the product path allows for a learning feedback loop between the exploration and utilization of the current product path, as well as providing input for future product paths to be chosen by the system.

In some embodiments, the demographic segmentation information used in creating customer compressions and relating customers to products within a product space can be used in performing analytics that test the effectiveness of persuading a customer to follow a particular product path. In various embodiments, interfaces can be included that provide of various attributes of segmented customer groups, recommended content attributes of products to associate with various customer segments, as well as transactional history information of customers in relation to this recommended content. In various embodiments, this customer and product attribute information can be displayed in relation to distance information between a customer's current location within a product space and ultimate goal locations within the product space to where a business would like to lead a customer. In some embodiments, interfaces can be provided that present relationships between various customer attributes and how those attributes provide connections between different customer segments. Some example user interfaces providing such functionality are described below in reference to FIG. 12-FIG. 16.

Figure 12:
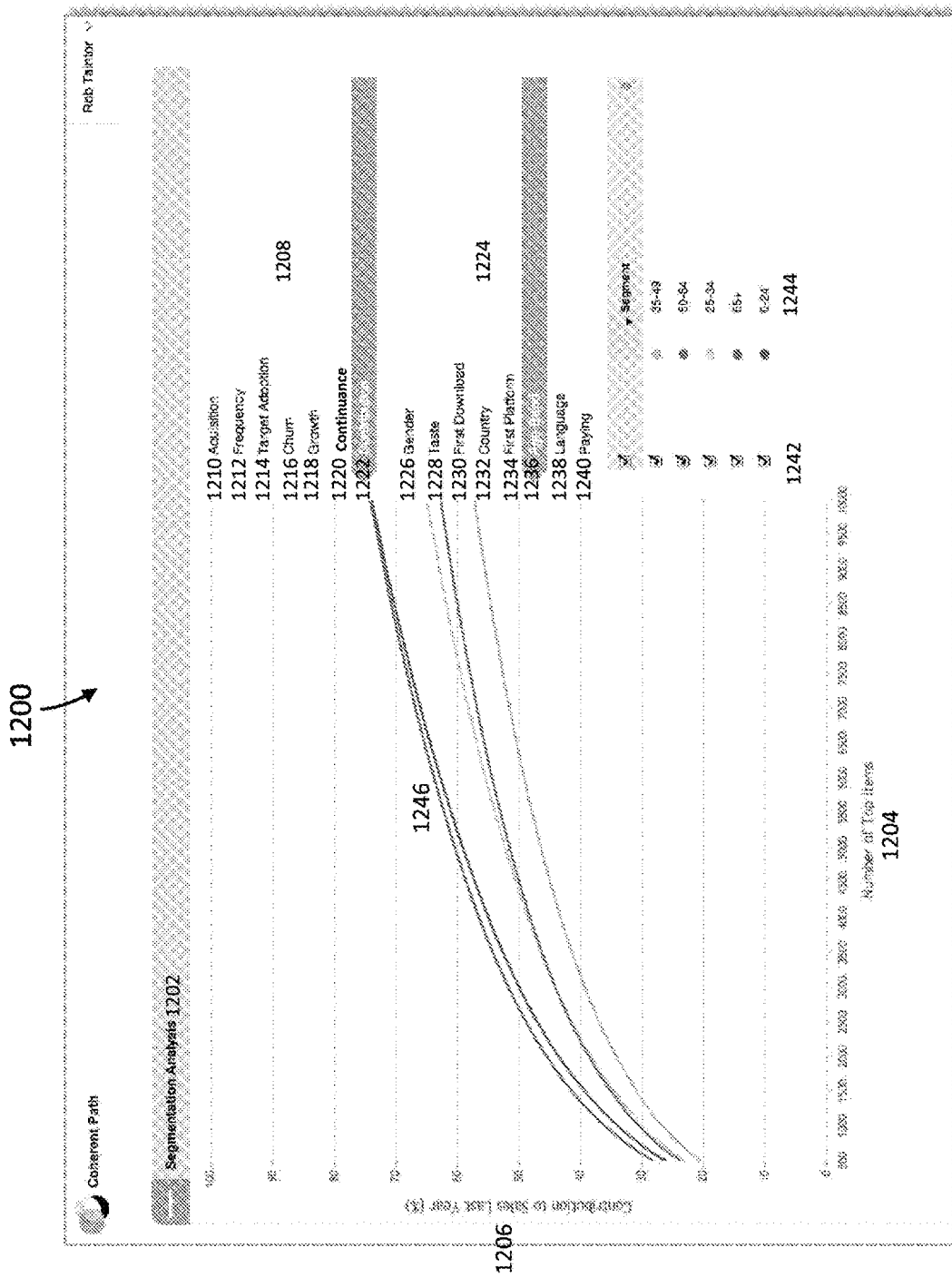
FIG. 12 illustrates an example user interface of segmentation analytics representing the results of influencing customers' movement through a product space.

FIG. 12 depicts an example analytical chart 1200 presented by the user interface 120 showing particular customer segmentation analysis 1202 for customer interactions modeled with products in a particular product space. In this example, a total number of top items 1204 on the independent axis is plotted against a contribution to sales in the last year 1206 along the dependent axis of the chart. In various embodiments, the user interface 120 provides functionality for interactive manipulation of the analytical chart 1200. In this example, the user can choose the dependent axis to be one of a number of categories 1208 including "Acquisition" 1210, "Frequency" 1212, "Target Adoption" 1214, "Churn" 1216, "Growth" 1218, "Continuance" 1220, and "Contribution" 1222, where the user 126 has chosen to analyze the "Contribution" 1222 category. In various embodiments, the analytical charts presented by the user interface can also allow the user to select various data subsets 1224 from which to produce analytical graphs of the data measured by the business intelligence engine 118. In this example, the data subsets include "Gender" 1226, "Taste" 1228, "First Download" 1230, "Country" 1232, "First Platform" 1234, "Age Band" 1236, "Language" 1238, and "Paying" 1240, where the user 126 has chosen to display from the "Age Band" 1236 data subset. In some embodiments, the user interface 126 provides functionality within the analytical chart 1200 to plot multiple distinct portions of the data subset. In this example, the column of control boxes 1242 associated with distinct portions of the data subset 1244 allow the user to turn on or off the various curves 1246 plotted on the chart 1200. The combination of various data segmentation capabilities and display capabilities within an analytical chart, such as chart 1200, can provide a user 126 with deep insights as to the effectiveness of customer campaign or series of customer interactions through a product space.

Figure 13:
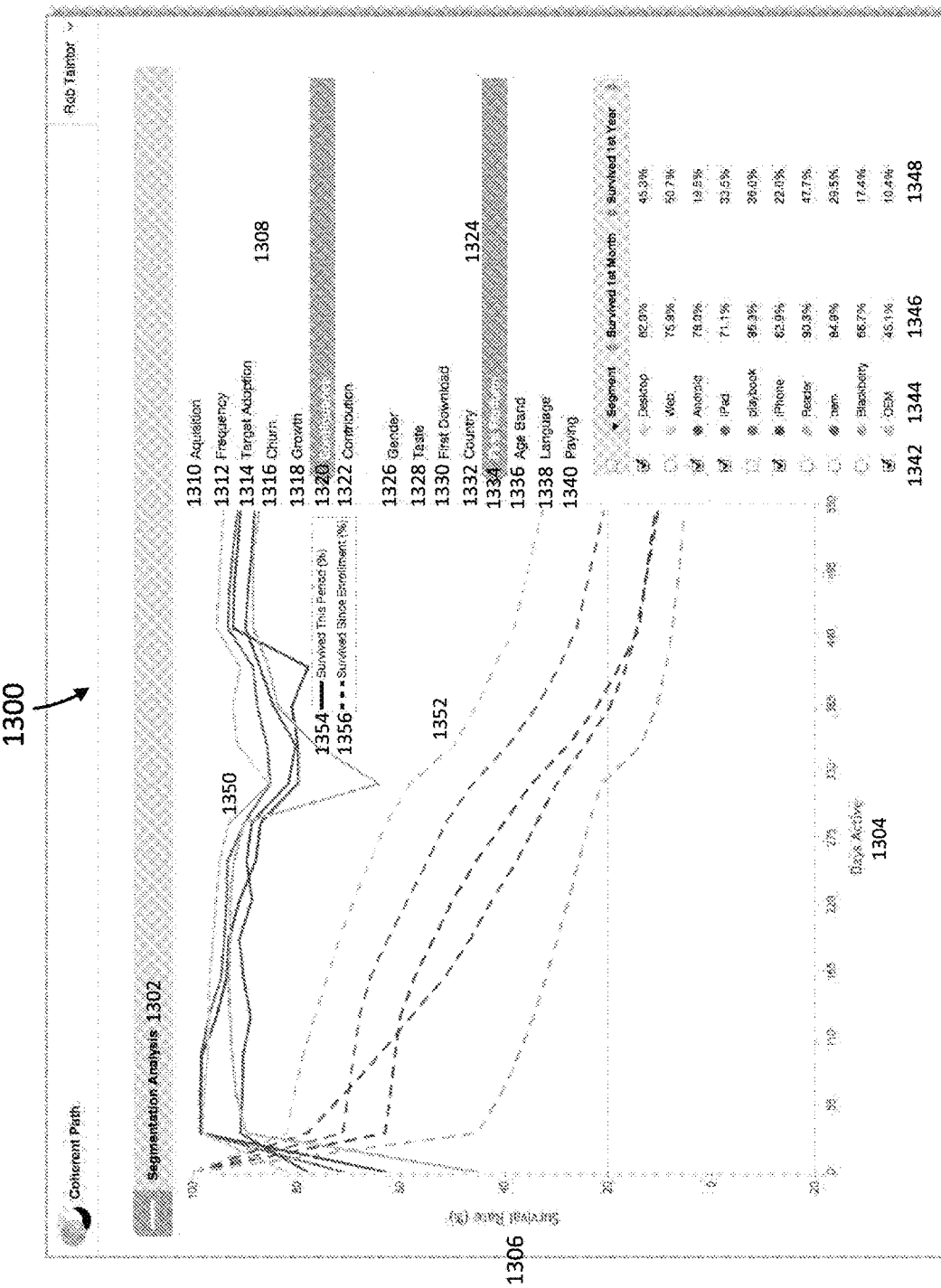
FIG. 13 illustrates another example user interface of segmentation analytics representing the results of influencing customers' movement through a product space.

FIG. 13 is a depiction of another example analytical chart 1300 presented by the user interface 120 showing particular customer segmentation analysis 1302 for customer interactions modeled with products in a particular product space. In this example, the independent axis 1304 represents the number of days a customer has been active within a particular product space. Similar to the functionality of analytical chart 1200, a user 120 can select the quantity displayed on the dependent axis 1306 from a variety of categories 1308, including "Adoption" 1310, "Frequency" 1312, "Target Adoption" 1314, "Churn" 1316, "Growth" 1318, "Continuance" 1320, and "Contribution" 1322. In this example, the user 126 has selected the category "Continuance" 1320 which displays as a percentage value continuance rate on the dependent axis 1306. Also similar to the functionality of analytical chart 1200, the user 126 can select from a variety of different data subsets 1324 from which to produce analytical graphs of the data measured by the business intelligence engine 118. In this example, the data subsets include "Gender" 1326, "Taste" 1328, "First Download" 1330, "Country" 1332, "First Platform" 1334, "Age Band" 1336, "Language" 1338, and "Paying" 1340, where the user 126 has chosen to display from the "First Platform" 1334 data subset. Also similar to the capabilities provided by the user interface 120 within chart 1200, chart 1300 includes functionality to plot multiple distinct portions of the data subset. In this example, the column of control boxes 1342 associated with distinct portions of the data subset 1344 allow the user to turn on or off the various curves 1350 and 1354 plotted on the chart 1300. In this example, the chart provides capabilities for plotting separate time period subsets 1346 and 1348 which result in separate sets of curves 1350 and 1352 described by corresponding legend entries 1354 and 1356.

Figure 14:
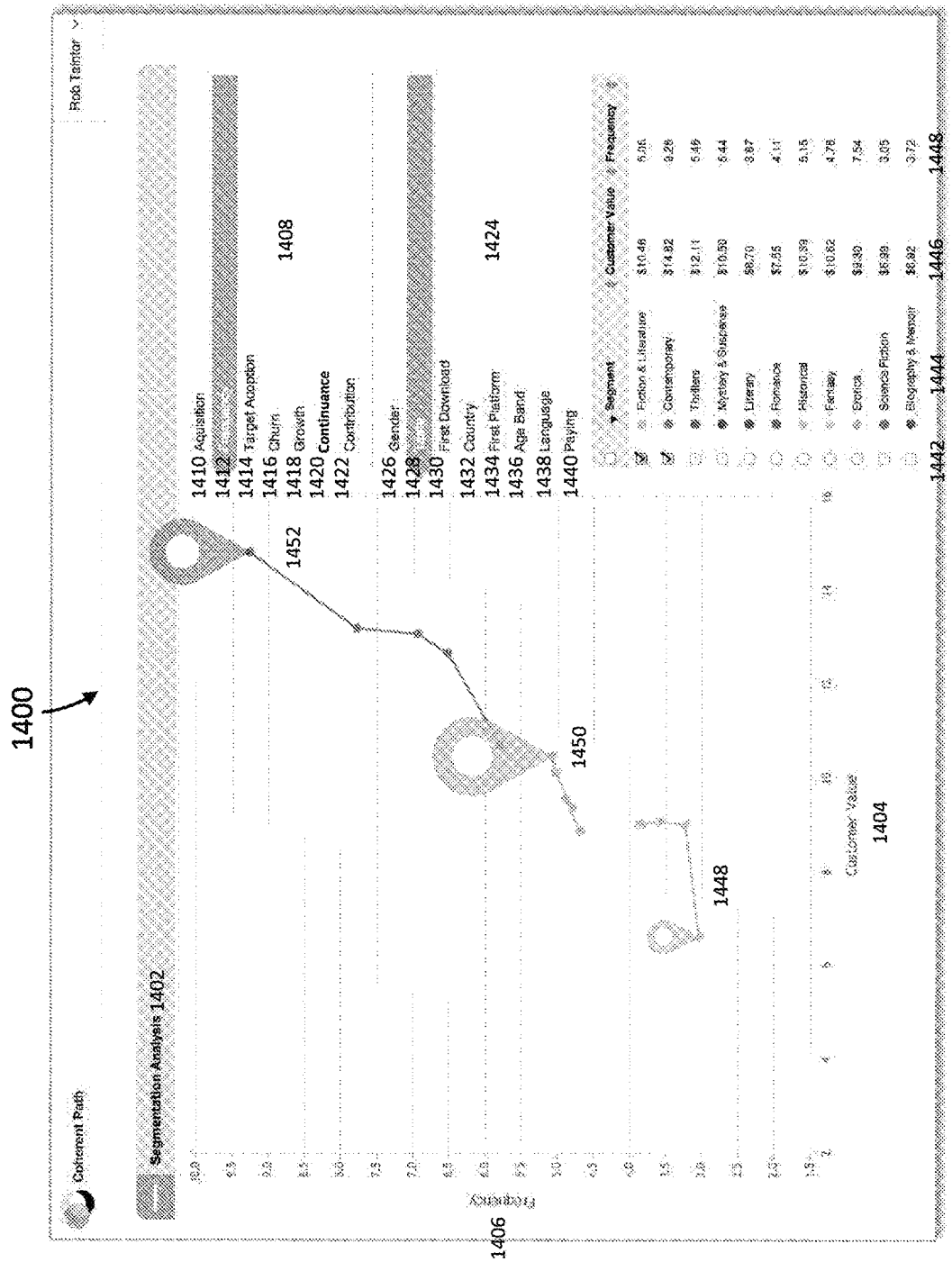
FIG. 14 illustrates another example user interface of segmentation analytics representing the results of influencing customers' movement through a product space.

FIG. 14 depicts a third example analytical chart 1400 incorporating a segmentation analysis 1402 presented by the user interface 120. In this example, the independent axis 1404 represents a customer value metric measured by the business intelligence engine 118. Similar to the functionality of analytical charts 1200 and 1300, a user 120 can select the quantity displayed on the dependent axis 1406 from a variety of categories 1408, including "Adoption" 1410, "Frequency" 1412, "Target Adoption" 1414, "Churn" 1416, "Growth" 1418, "Continuance" 1420, and "Contribution" 1422. In this example, the user 126 has selected the category "Frequency" 1412 which displays as a numerical value on the dependent axis 1406. Also similar to the functionality of analytical charts 1200 and 1300, the user 126 can select from a variety of different data subsets 1424 from which to produce analytical graphs of the data measured by the business intelligence engine 118. In this example, the data subsets include "Gender" 1426, "Taste" 1428, "First Download" 1430, "Country" 1432, "First Platform" 1434, "Age Band" 1436, "Language" 1438, and "Paying" 1440, where the user 126 has chosen to display from the "Taste" 1434 data subset. Also similar to the capabilities provided by the user interface 120 within charts 1200 and 1300, chart 1400 includes functionality to plot multiple distinct portions of the data subset. In this example, the column of control boxes 1442 associated with distinct portions of the data subset 1444 allow the user to turn on or off the various curves on the chart 1400. In this example, the user 126 has selected only three curves 1448, 1450, and 1452 representing different portions of the data subset. In this example, the chart 1400 also includes columns 1446 and 1448 that display number values associated with particular highlighted points in the curves 1448, 1450, and 1452. In this example, the curves 1448, 1450, and 1452 display a time series of results for the different portion of the data subset at three month intervals over the course of the prior year.

Various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems.

Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 17:
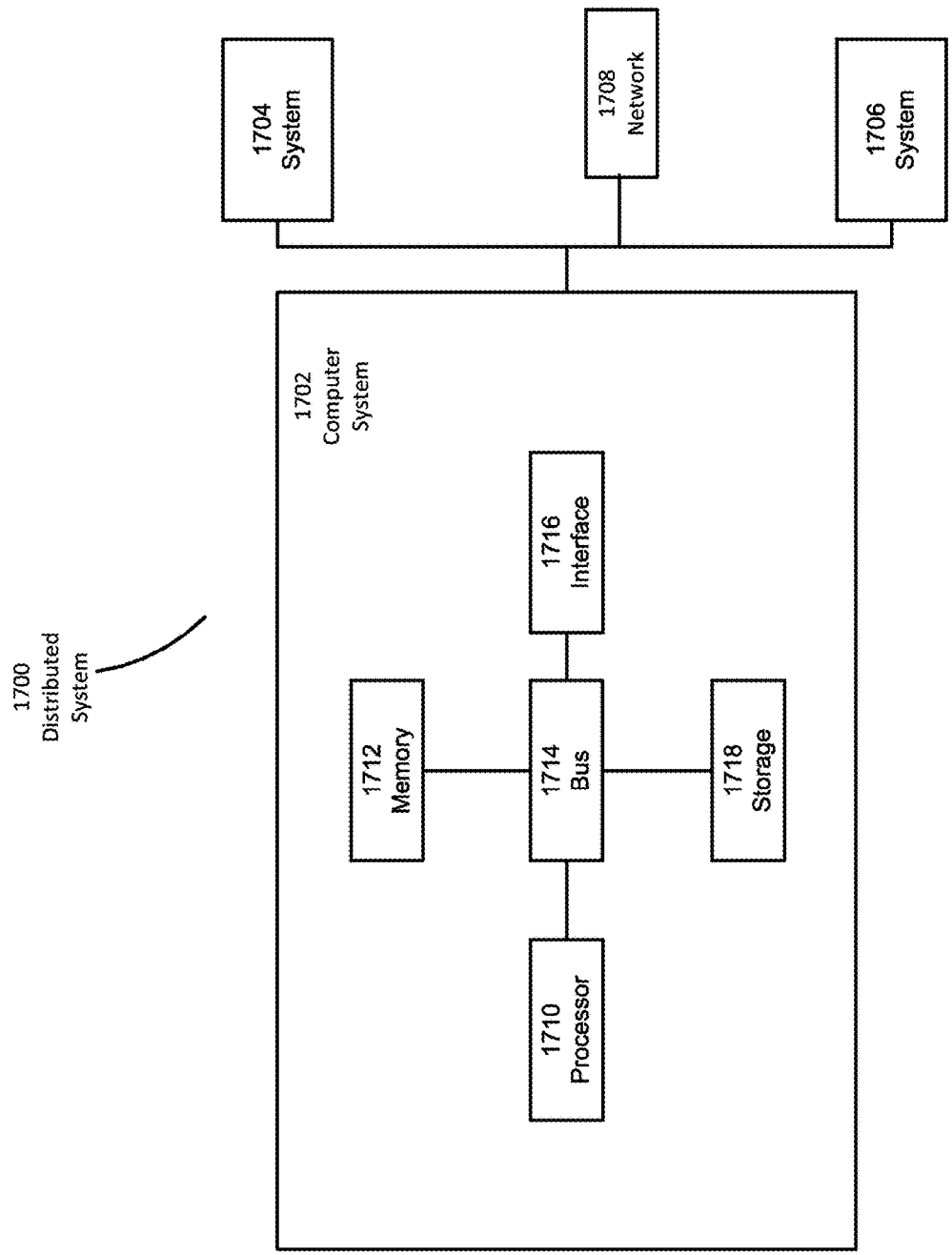
FIG. 17 illustrates an example computer system that may implement various processes disclosed herein.

Referring to FIG. 17, there is illustrated a block diagram of a distributed computer system 1700, in which various aspects and functions are practiced. As shown, the distributed computer system 1700 includes one more computer systems that exchange information. More specifically, the distributed computer system 1700 includes computer systems 1702, 1704 and 1706. As shown, the computer systems 1702, 1704 and 1706 are interconnected by, and may exchange data through, a communication network 1708. The network 1708 may include any communication network through which computer systems may exchange data. To exchange data using the network 1708, the computer systems 1702, 1704 and 1706 and the network 1708 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 1702, 1704 and 1706 may transmit data via the network 1708 using a variety of security measures including, for example, TLS, SSL or VPN. While the distributed computer system 1700 illustrates three networked computer systems, the distributed computer system 1700 is not so limited and may include any number of computer systems and computing devices, networked using any medium and communication protocol.

As illustrated in FIG. 17, the computer system 1702 includes a processor 1710, a memory 1712, a bus 1714, an interface 1716 and data storage 1718. To implement at least some of the aspects, functions and processes disclosed herein, the processor 1710 performs a series of instructions that result in manipulated data. The processor 1710 may be any type of processor, multiprocessor or controller. Some exemplary processors include commercially available processors such as an Intel Xeon, Itanium, Core, Celeron, or Pentium processor, an AMD Opteron processor, a Sun UltraSPARC, ARM processor, or IBM Power5+ processor and an IBM mainframe chip. The processor 1710 is connected to other system components, including one or more memory devices 1712, by the bus 1714. The memory 1712 stores programs and data during operation of the computer system 1702. Thus, the memory 1712 may be a relatively high performance, volatile, random access memory such as a dynamic random access memory (DRAM) or static memory (SRAM). However, the memory 1712 may include any device for storing data, such as a disk drive or other nonvolatile storage device. Various examples may organize the memory 1712 into particularized and, in some cases, unique structures to perform the functions disclosed herein. These data structures may be sized and organized to store values for particular data and types of data.

Components of the computer system 1702 are coupled by an interconnection element such as the bus 1714. The bus 1714 may include one or more physical busses, for example, busses between components that are integrated within a same machine, but may include any communication coupling between system elements including specialized or standard computing bus technologies such as IDE, SCSI, PCI and InfiniBand. The bus 1714 enables communications, such as data and instructions, to be exchanged between system components of the computer system 1702.

The computer system 1702 also includes one or more interface devices 1716 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1702 to exchange information and to communicate with external entities, such as users and other systems.

The data storage 1718 includes a computer readable and writeable nonvolatile, or non-transitory, data storage medium in which instructions are stored that define a program or other object that is executed by the processor 1710. The data storage 1718 also may include information that is recorded, on or in, the medium, and that is processed by the processor 1710 during execution of the program. More specifically, the information may be stored in one or more data structures specifically configured to conserve storage space or increase data exchange performance. The instructions may be persistently stored as encoded signals, and the instructions may cause the processor 1710 to perform any of the functions described herein. The medium may, for example, be optical disk, magnetic disk or flash memory, among others. In operation, the processor 1710 or some other controller causes data to be read from the nonvolatile recording medium into another memory, such as the memory 1712, that allows for faster access to the information by the processor 1710 than does the storage medium included in the data storage 1718. The memory may be located in the data storage 1718 or in the memory 1712, however, the processor 1710 manipulates the data within the memory, and then copies the data to the storage medium associated with the data storage 1718 after processing is completed. A variety of components may manage data movement between the storage medium and other memory elements and examples are not limited to particular data management components. Further, examples are not limited to a particular memory system or data storage system.

Although the computer system 1702 is shown by way of example as one type of computer system upon which various aspects and functions may be practiced, aspects and functions are not limited to being implemented on the computer system 1702 as shown in FIG. 17. Various aspects and functions may be practiced on one or more computers having a different architectures or components than that shown in FIG. 17. For instance, the computer system 1702 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1702 may be a computer system including an operating system that manages at least a portion of the hardware elements included in the computer system 1702. In some examples, a processor or controller, such as the processor 1710, executes an operating system. Examples of a particular operating system that may be executed include a Windows-based operating system, such as, Windows NT, Windows 2000 (Windows ME), Windows XP, Windows Vista, Windows 7, Windows 8, or Windows RT operating systems, available from the Microsoft Corporation, a MAC OS System X or iOS operating system available from Apple Computer, one of many Linux-based operating system distributions, for example, the Enterprise Linux operating system available from Red Hat Inc. or Android operating system from Google, Inc., a Solaris operating system available from Oracle Corporation, or a UNIX operating systems available from various sources. Many other operating systems may be used, and examples are not limited to any particular operating system.

The processor 1710 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used.

Alternatively, functional, scripting, or logical programming languages may be used. Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A system configured to influence human behavior, the system comprising:
   a memory storing information descriptive of a plurality of products and at least one customer;
   at least one processor coupled to the memory and configured to:
   retrieve the information descriptive of the plurality of products from the memory;
   generate a product space representative of relationships between the plurality of products;
   generate a customer compression representative of a behavior of the at least one customer within the product space, the customer compression having a current position within the product space, the current position comprising at least one product within the product space;
   overlay the customer compression on the product space to identify a plurality of trajectories of the customer compression through the product space, the plurality of trajectories comprising a current trajectory and one or more alternative trajectories, each trajectory of the plurality of trajectories representing a sequence of three or more products within the product space, the current trajectory comprising a first product adjacent to the current position having a first distance from the current position;

identify a target trajectory within the one or more alternative trajectories, the target trajectory connecting the current position to a goal position and comprising a second product adjacent to the current position having a second distance from the current position that is greater than the first distance; and transmit information descriptive of an offering of the second product to one or more processors distinct from the at least one processor.

2. The system of claim 1, wherein the target trajectory is comprised of a geodesic defined on a hyperbolic geometry.

3. The system of claim 1, wherein the at least one processor is further configured to receive business objective information representative of a desired termination product of the target trajectory within the product space.

4. The system of claim 3, wherein the at least one processor is further configured to generate the offering based on the current trajectory and the desired termination product.

5. The system of claim 4, wherein the at least one processor is further configured to output a visualization comprising an indication of the offering.

6. The system of claim 4, wherein the at least one processor is further configured to measure an impact of the offering on the current trajectory.

7. A method for influencing human behavior, the method comprising:

storing, in a memory coupled to at least one processor, information descriptive of a plurality of products and at least one customer;

retrieving, by the at least one processor, the information descriptive of the plurality of products from the memory;

generating, by the at least one processor, a product space representative of relationships between the plurality of products;

generating, by the at least one processor, a customer compression representative of a behavior of the at least one customer within the product space, the customer compression having a current position within the product space, the current position comprising at least one product within the product space;

overlaying, by the at least one processor, the customer compression on the product space to identify a plurality of trajectories of the customer compression through the product space, the plurality of trajectories comprising a current trajectory and one or more alternative trajectories, each trajectory of the plurality of trajectories representing a sequence of three or more products within the product space, the current trajectory comprising a first product adjacent to the current position having a first distance from the current position;

identifying, by the at least one processor, a target trajectory within the one or more alternative trajectories, the target trajectory connecting the current position to a goal position and comprising a second product adjacent to the current position having a second distance from the current position that is greater than the first distance; and transmitting information descriptive of an offering of the second product to one or more processors distinct from the at least one processor.

8. The method of claim 7, wherein identifying the target trajectory includes identifying a geodesic defined on a hyperbolic geometry.

9. The method of claim 7, further comprising receiving business objective information representative of a desired termination product of the target trajectory within the product space.

10. The method of claim 9, further comprising generating the offering based on the current trajectory and the desired termination product.

11. The method of claim 10, further comprising outputting an indication of the offering.

12. The method of claim 10, further comprising measuring an impact of the offering on the current trajectory.

13. A non-transitory computer readable medium having stored thereon sequences of computer-executable instructions for influencing human behavior including instructions that instruct at least one processor to:

store in a memory, information descriptive of a plurality of products and at least one customer;

retrieve the information descriptive of the plurality of products from the memory;

generate a product space representative of relationships between the plurality of products;

generate a customer compression representative of a behavior of the at least one customer within the product space, the customer compression having a current position within the product space, the current position comprising at least one product within the product space;

overlay the customer compression on the product space to identify a plurality of trajectories of the customer compression through the product space, the plurality of trajectories comprising a current trajectory and one or more alternative trajectories, each trajectory of the plurality of trajectories representing a sequence of three or more products within the product space, the current trajectory comprising a first product adjacent to the current position having a first distance from the current position;

identify a target trajectory within the one or more alternative trajectories, the target trajectory connecting the current position to a goal position and comprising a second product adjacent to the current position having a second distance from the current position that is greater than the first distance; and transmit information descriptive of an offering of the second product to one or more processors distinct from the at least one processor.

* * * * *